US011675173B2

(12) United States Patent
Komatsu

(10) Patent No.: US 11,675,173 B2
(45) Date of Patent: Jun. 13, 2023

(54) EXTENDER LENS, OPTICAL SYSTEM, AND IMAGING APPARATUS

(71) Applicant: FUJIFILM Corporation, Tokyo (JP)

(72) Inventor: Daiki Komatsu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 276 days.

(21) Appl. No.: 17/030,511

(22) Filed: Sep. 24, 2020

(65) Prior Publication Data

US 2021/0096344 A1 Apr. 1, 2021

(30) Foreign Application Priority Data

Sep. 30, 2019 (JP) .............................. JP2019-180387
Jun. 4, 2020 (JP) .............................. JP2020-097898

(51) Int. Cl.
*G02B 15/177* (2006.01)
*G02B 15/20* (2006.01)
*G02B 27/00* (2006.01)
*G02B 15/02* (2006.01)
*G02B 15/10* (2006.01)

(52) U.S. Cl.
CPC .......... *G02B 15/177* (2013.01); *G02B 15/02* (2013.01); *G02B 15/10* (2013.01); *G02B 15/20* (2013.01); *G02B 27/0025* (2013.01); *G02B 27/0075* (2013.01)

(58) Field of Classification Search
CPC .. G02B 15/177; G02B 15/20; G02B 15/1421; G02B 15/02; G02B 15/04; G02B 27/0075; G02B 15/10
USPC ................................................. 359/683, 692
See application file for complete search history.

(56) References Cited

U.S. PATENT DOCUMENTS

| 6,307,683 | B1 | 10/2001 | Miyano |
| 10,698,187 | B2* | 6/2020 | Tanaka ................ G02B 13/18 |
| 2013/0308041 | A1* | 11/2013 | Hatada ............ G02B 15/144111 359/557 |
| 2014/0362450 | A1 | 12/2014 | Shimomura |

(Continued)

FOREIGN PATENT DOCUMENTS

| CN | 108693634 A | 10/2018 |
| JP | 2000-275521 A | 10/2000 |
| JP | 2012-027308 A | 2/2012 |

(Continued)

OTHER PUBLICATIONS

An Office Action; "Notice of Reasons for Refusal," mailed by the Japanese Patent Office dated Jun. 28, 2022, which corresponds to Japanese Patent Application No. 2020-097898 and is related to U.S. Appl. No. 17/030,511; with English language translation.

*Primary Examiner* — Kristina M Deherrera
(74) *Attorney, Agent, or Firm* — Studebaker & Brackett PC

(57) ABSTRACT

An extender lens changes a focal length of an entire lens system after replacement to a longer focal length side than a focal length of a master lens by replacing a part of the master lens with the extender lens. The extender lens consists of, in order from an object side to an image side, a first lens group, and a negative second lens group. The first lens group is a lens group that has a positive refractive power as a whole and has a shortest focal length among lens groups consisting of one lens component or a plurality of consecutively arranged lens components. The extender lens satisfies a predetermined conditional expression.

17 Claims, 15 Drawing Sheets

(56) References Cited

U.S. PATENT DOCUMENTS

2020/0081232 A1   3/2020   Sakuma

FOREIGN PATENT DOCUMENTS

| JP | 5137715 B2 * | 2/2013 |
| JP | 2016-045310 A | 4/2016 |
| JP | 2017-181577 A | 10/2017 |
| JP | 2018-194730 A | 12/2018 |
| JP | 2020-042062 A | 3/2020 |

* cited by examiner

EXAMPLE 1

FIG. 3
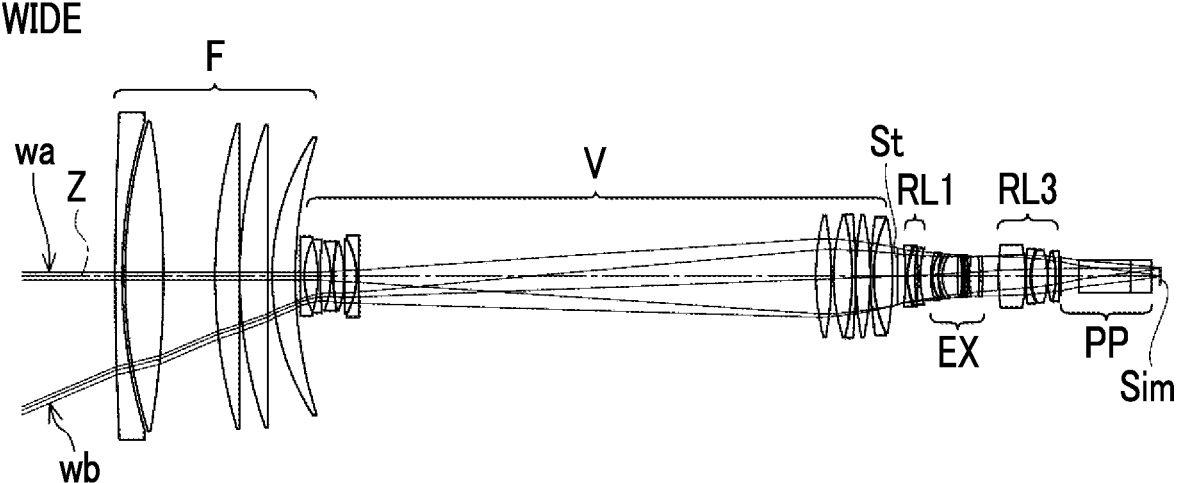
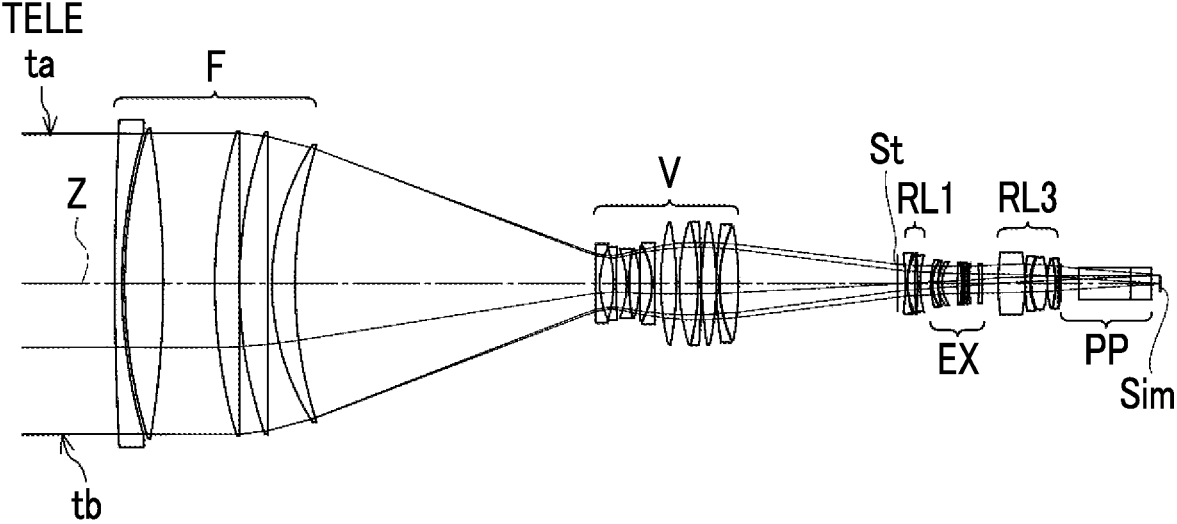

EXAMPLE 3

FIG. 10
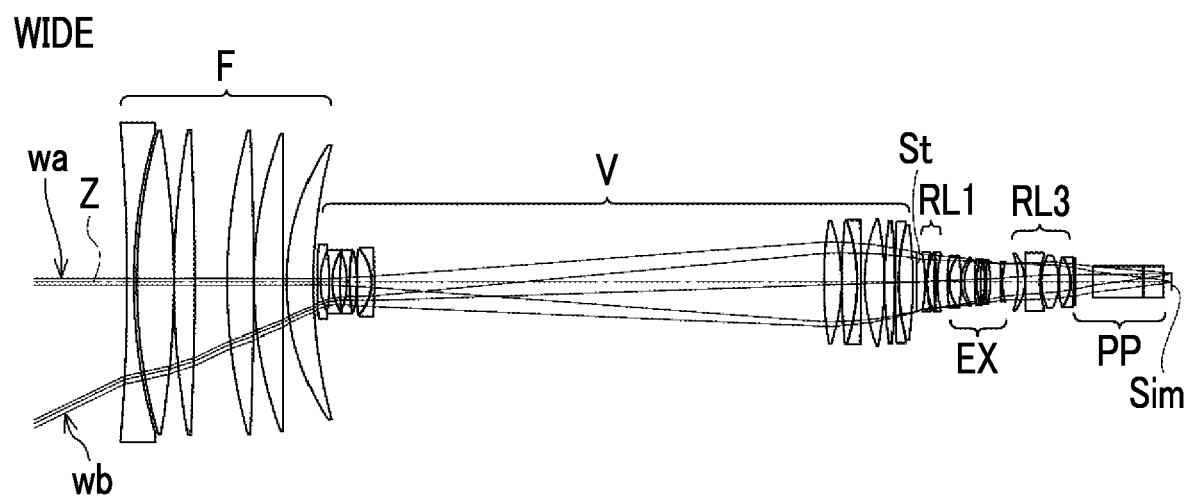
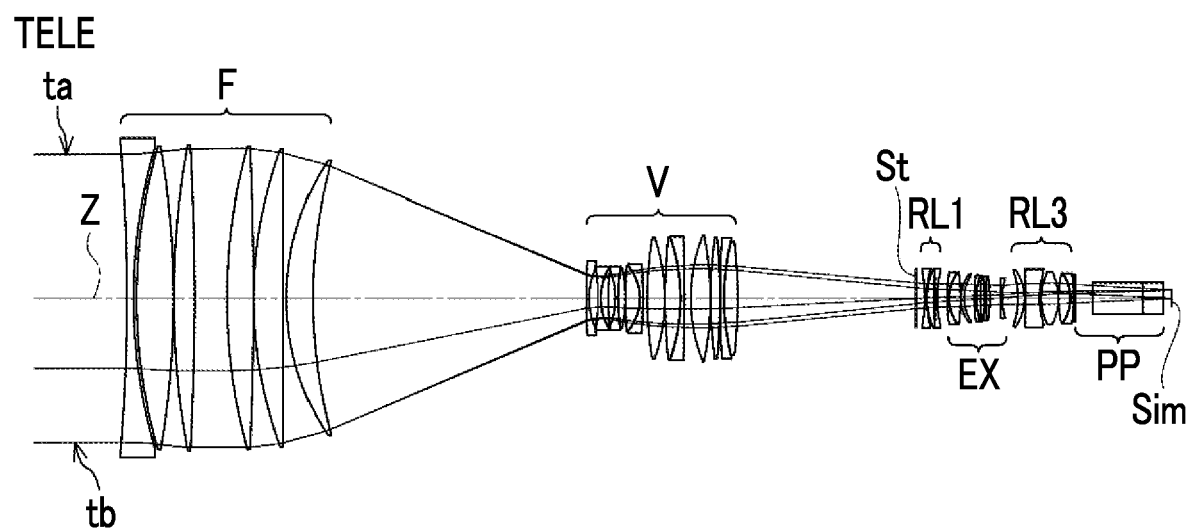

MASTER LENS

EXTENDER LENS, OPTICAL SYSTEM, AND IMAGING APPARATUS

CROSS-REFERENCE TO RELATED APPLICATIONS

The present application claims priority under 35 U.S.C. § 119 to Japanese Patent Application No. 2019-180387, filed on Sep. 30, 2019 and Japanese Patent Application No. 2020-097898, filed on Jun. 4, 2020, the contents of which are hereby expressly incorporated herein by reference in their entirety.

BACKGROUND OF THE INVENTION

1. Field of the Invention

The technology of the present disclosure relates to an extender lens, an optical system, and an imaging apparatus.

2. Description of the Related Art

In the related art, an extender lens that is arranged to be insertable and detachable inside a master lens for imaging and changes a focal length of the entire lens system after insertion to a longer focal length side than a focal length of the master lens has been known in the field of broadcasting camera or the like.

For example, JP2016-045310A discloses a zoom lens composed of, in order from an object side to an image side, a first lens group that has a positive refractive power and is not moved for zooming, a second lens group that has a negative refractive power and is moved during zooming, a front relay lens group that has a positive refractive power and includes an aperture stop, an extender lens group that is insertable and removable on an optical path, and a rear relay lens group that is not moved for zooming.

JP2000-275521A discloses a zoom lens consisting of a zoom lens main body consisting of four or more lens groups, and a focal length conversion lens group arranged to be movable into and out of a space in or before and after the lens groups of the zoom lens main body on an optical axis.

JP2017-181577A discloses a zoom lens composed of, in order from an object side to an image side, a focus lens group that is moved during focusing, a zooming lens group composed of two or more lens groups moving during zooming, an aperture stop, and a relay lens group that includes an extender lens group mounted to be attachable and detachable from an optical path and is not moved for zooming.

SUMMARY OF THE INVENTION

An object of the technology of the present disclosure is to provide an extender lens having favorable optical characteristics, an optical system comprising the extender lens, and an imaging apparatus comprising the extender lens.

One aspect of the technology of the present disclosure is an extender lens that changes a focal length of an entire lens system after replacement to a longer focal length side than a focal length of a master lens by replacing a part of the master lens with the extender lens, the extender lens consisting of, in order from an object side to an image side, a first lens group, and a second lens group having a negative refractive power as a whole, in which in a case where one lens component is assumed as one single lens or one cemented lens, the first lens group is a lens group that has a positive refractive power as a whole and has a shortest focal length among lens groups consisting of one lens component or a plurality of consecutively arranged lens components, and in a case where a distance from a surface of the extender lens closest to the object side to a surface of the extender lens closest to the image on an optical axis is denoted by TLex, and a focal length of the first lens group is denoted by f1, Conditional Expression (1) below is satisfied.

$$0.1 < TLex/f1 < 0.36 \tag{1}$$

It is preferable that the extender lens of the above aspect further satisfies Conditional Expression (1-1) below.

$$0.15 < TLex/f1 < 0.33 \tag{1-1}$$

In a case where a focal length of the second lens group is denoted by f2, and a focal length of the extender lens is denoted by fex, it is preferable to satisfy Conditional Expression (2) below, and it is more preferable to satisfy Conditional Expression (2-1) below.

$$0.23 < f2/fex < 0.5 \tag{2}$$

$$0.24 < f2/fex < 0.46 \tag{2-1}$$

In a case where the focal length of the first lens group is denoted by f1, and a focal length of the extender lens is denoted by fex, it is preferable to satisfy Conditional Expression (3), and it is more preferable to satisfy Conditional Expression (3-1) below.

$$-1 < f1/fex < -0.25 \tag{3}$$

$$-1 < f1/fex < -0.35 \tag{3-1}$$

In a case where a d line-based Abbe number is denoted by vn and a partial dispersion ratio between g line and F line is denoted by θgFn for at least one negative lens of the second lens group, it is preferable to satisfy Conditional Expressions (4) and (5) below. It is more preferable to satisfy at least one of Conditional Expression (4-1) or (5-1) below after satisfying Conditional Expressions (4) and (5).

$$60 < vn \tag{4}$$

$$0.64 < \theta gFn + 0.001625 \times vn < 0.7 \tag{5}$$

$$60 < vn < 86 \tag{4-1}$$

$$0.64 < \theta gFn + 0.001625 \times vn < 0.68 \tag{5-1}$$

In a case where a focal length of the second lens group is denoted by f2, and a focal length of at least one negative lens of the second lens group satisfying Conditional Expressions (4) and (5) above is denoted by f2n, it is preferable to satisfy Conditional Expression (6), and it is more preferable to satisfy Conditional Expression (6-1) below.

$$0.1 < f2/f2n < 1.5 \tag{6}$$

$$0.15 < f2/f2n < 1 \tag{6-1}$$

In a case where a temperature coefficient of a relative refractive index of at least one negative lens of the second lens group satisfying Conditional Expressions (4), (5), and (6) above within a range of 20° C. to 40° C. with respect to d line is denoted by dN/dT, it is preferable to satisfy Conditional Expression (7) below. The unit of dN/dT is ° C.$^{-1}$.

$$-7 \times 10^{-6} < dN/dT < -2 \times 10^{-6} \tag{7}$$

It is preferable that the first lens group includes a lens of which a surface on the object side has a convex surface, and in a case where a radius of curvature of a surface on the object side is denoted by Rf and a radius of curvature of a surface on an image side is denoted by Rr for at least one lens of the first lens group of which the surface on the object side has the convex surface, it is preferable to satisfy Conditional Expression (8) below, and it is more preferable to satisfy Conditional Expression (8-1) below.

$$-0.08 < (Rf-Rr)/(Rf+Rr) < 0.05 \quad (8)$$

$$-0.07 < (Rf-Rr)/(Rf+Rr) < 0.03 \quad (8\text{-}1)$$

It is preferable that the first lens group further includes a cemented lens in which a negative lens and a positive lens are cemented, in addition to the lens of which the surface on the object side has the convex surface and that satisfies Conditional Expression (8) above.

It is preferable that the first lens group includes, consecutively in order from a side closest to the object side to the image side, a cemented lens in which a negative lens and a positive lens of which surfaces on the object side have convex surfaces are cemented in order from the object side, and the lens of which the surface on the object side has the convex surface and that satisfies Conditional Expression (8).

Another aspect of the technology of the present disclosure is an optical system comprising a master lens that is a zoom lens, and the extender lens of the above aspect.

Still another aspect of the technology of the present disclosure is an imaging apparatus comprising the extender lens of the above aspect.

In the present specification, "consist of . . . " or "consisting of . . . " means that lenses substantially not having a refractive power, non-lens optical elements such as a stop, a filter, and a cover glass, mechanism parts such as a lens flange, a lens barrel, an imaging element, and a camera shake correction mechanism, and the like may be included in addition to exemplified constituents.

In the present specification, a "lens having a positive refractive power" and a "positive lens" have the same meaning. A "lens having a negative refractive power" and a "negative lens" have the same meaning. A " . . . lens group" is not limited to a configuration consisting of a plurality of lenses and may be a configuration consisting of only one lens.

A "single lens" means one lens that is not cemented. A compound aspherical lens (lens that is composed of a spherical lens and a film of an aspherical shape formed on the spherical lens as a single unit and functions as one aspherical lens as a whole) is not regarded as a cemented lens and is handled as one lens. A sign of a refractive power, a surface shape, and a radius of curvature of a surface related to a lens including an aspherical surface are considered in a paraxial region unless otherwise specified. For a sign of the radius of curvature, the sign of the radius of curvature of a surface having a shape of a convex surface toward the object side is positive, and the sign of the radius of curvature of a surface having a shape of a convex surface toward the image side is negative.

The "focal length" used in the conditional expressions is a paraxial focal length. Values used in the conditional expressions except for the partial dispersion ratio are values based on d line in a state where an object at infinity is focused. A partial dispersion ratio θgF of a lens between g line and F line is defined as θgF=(Ng−Nf)/(NF−NC) in a case where refractive indexes of the lens with respect to g line, F line, and C line are denoted by Ng, NF, and NC, respectively. In the present specification, "d line", "C line", "F line", and "g line" are bright lines. A wavelength of d line is 587.56 nanometers (nm). A wavelength of C line is 656.27 nanometers (nm). A wavelength of F line is 486.13 nanometers (nm). A wavelength of g line is 435.83 nanometers (nm).

BRIEF DESCRIPTION OF THE DRAWINGS

FIG. 3 is a diagram illustrating a configuration of the entire lens system after replacement with the extender lens of Example 1 and luminous flux at a wide angle end and a telephoto end.

FIG. 10 is a diagram illustrating a configuration of the entire lens system after replacement with the extender lens of Example 3 and luminous flux at a wide angle end and a telephoto end.

DESCRIPTION OF THE PREFERRED EMBODIMENTS

Hereinafter, one example of an embodiment according to the technology of the present disclosure will be described with reference to the drawings. An optical system according to the embodiment of the technology of the present disclosure comprises a master lens ML and an extender lens EX capable of replacing a part of the master lens ML. The master lens ML is a lens system for imaging that can be applied to an imaging apparatus such as a broadcasting camera.

The extender lens EX is insertable and detachable on an optical path. By replacing a part of the master lens ML with the extender lens EX, the extender lens EX changes a focal length of the entire lens system after replacement to a longer focal length side than a focal length of the master lens ML while maintaining an image forming position to be constant. Here, the "entire lens system after replacement" is a lens system in which the rest (a part of the master lens ML not replaced with the extender lens EX) of the master lens ML and the extender lens EX are combined. In addition, "maintaining the image forming position to be constant" above is not limited to a case of complete matching and permits a slight error. For example, when a diameter of a permissible circle of confusion is denoted by δ and an F number of the entire lens system after replacement is denoted by AFN, the permissible error can be set as ±(δ×AFN).

Figure 1:
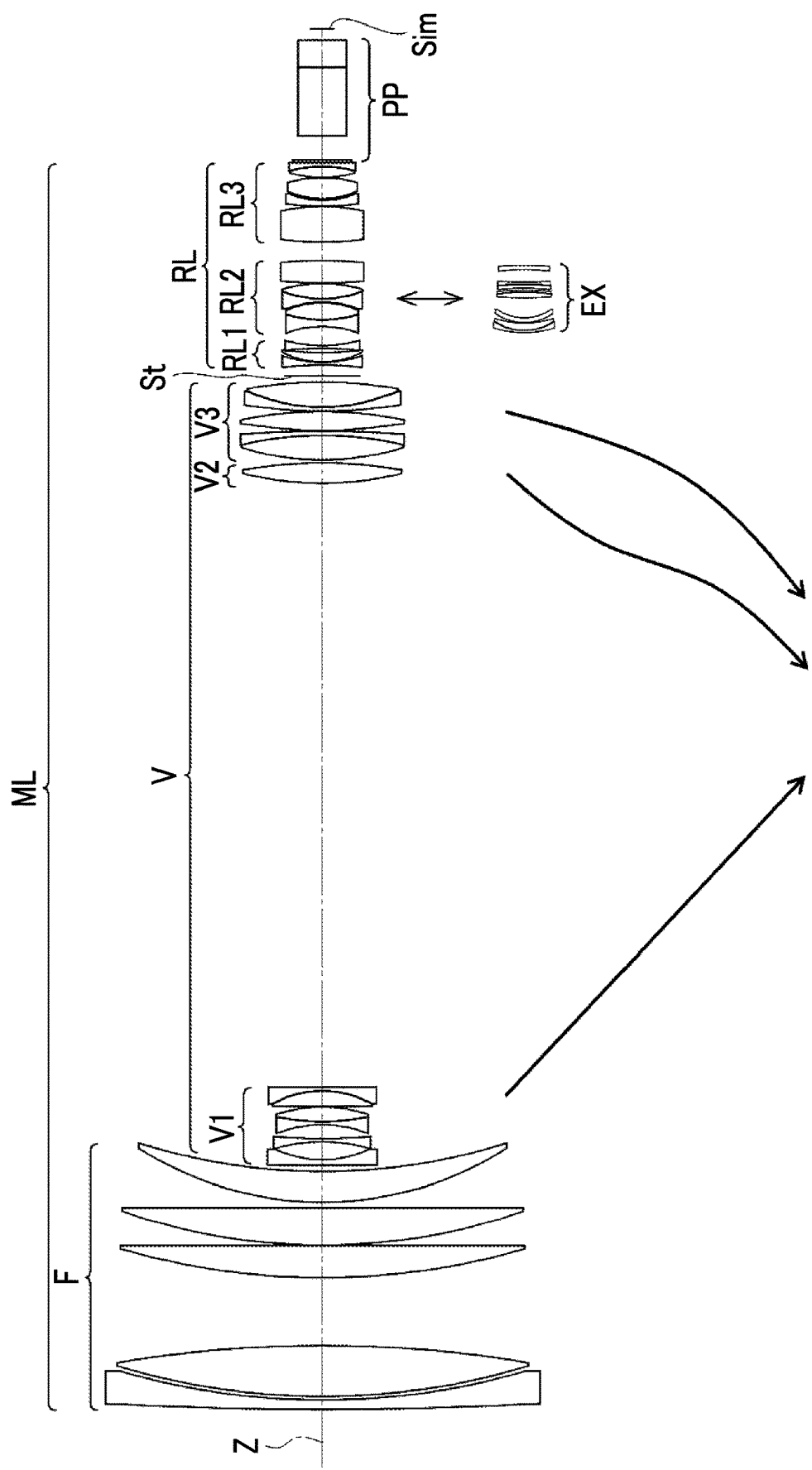
FIG. 1 is a diagram illustrating a cross-sectional view illustrating a configuration of an optical system according to one embodiment of the present disclosure and a movement trajectory, the optical system corresponding to a master lens and an extender lens of Example 1 of the present disclosure.

FIG. 1 illustrates a cross-sectional configuration diagram of the master lens ML and the extender lens EX according to one embodiment of the present disclosure. For example, the master lens ML illustrated in FIG. 1 is a zoom lens consisting of, in order from an object side to an image side, a focusing unit F, a zooming unit V, an aperture stop St, and an image forming unit RL.

In the case of applying the lens system to the imaging apparatus, it is preferable to comprise various filters, prisms, and/or cover glasses depending on specifications of the imaging apparatus. Thus, an example in which an optical member PP based on assumption of such a point is arranged between the image forming unit RL and an image plane Sim is illustrated in FIG. 1. For example, various filters include a low-pass filter and an infrared cut filter. The optical member PP is a member that does not have a refractive power and of which an incidence surface and an emission surface are in parallel. It can also be configured that the optical member PP is omitted.

The focusing unit F includes a lens group that is moved along an optical axis Z during focusing. The zooming unit V includes a lens group that is moved along the optical axis Z during zooming. For example, the zooming unit V in FIG. 1 consists of, in order from the object side to the image side, a V1 lens group V1, a V2 lens group V2, and a V3 lens group V3. These three lens groups are moved along the optical axis Z by changing an interval with an adjacent lens group during zooming. In FIG. 1, a movement trajectory of each lens group during zooming from a wide angle end to a telephoto end is schematically illustrated by an arrow below each of the three lens groups. In the example in FIG. 1, the focusing unit F and the image forming unit RL are fixed with respect to the image plane Sim during zooming.

The image forming unit RL consists of, in order from the object side to the image side, an RL1 lens group RL1, an RL2 lens group RL2, and an RL3 lens group RL3. The RL2 lens group RL2 is insertable and detachable on the optical path and is configured to be replaceable with the extender lens EX. In the following description with reference to the example in FIG. 1, a lens system consisting of the focusing unit F, the zooming unit V, the aperture stop St, the RL1 lens group RL1, the extender lens EX, and the RL3 lens group RL3 will be referred to as the "entire lens system after replacement".

Figure 2:
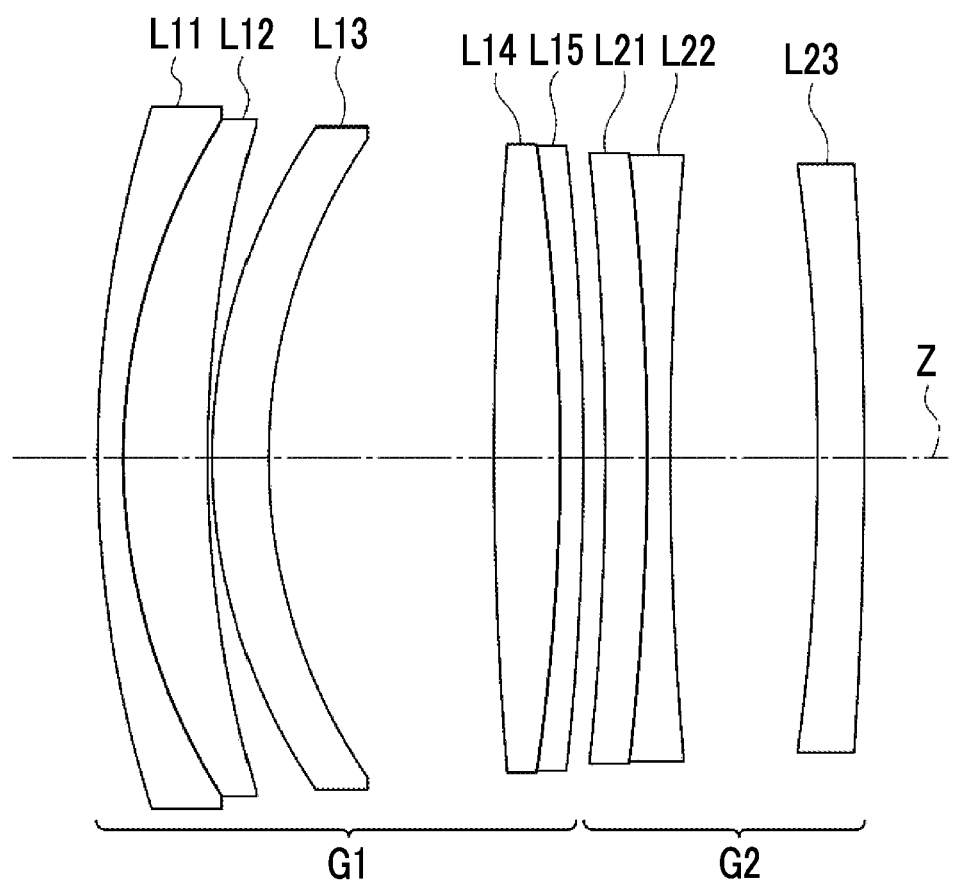
FIG. 2 is a cross-sectional configuration diagram of the extender lens of Example 1.

FIG. 2 illustrates a cross-sectional configuration diagram of one example of the extender lens EX. The example illustrated in FIG. 2 corresponds to Example 1 described later. FIG. 3 illustrates a configuration of the entire lens system after replacement and luminous flux at the wide angle end and the telephoto end. In FIG. 3, a wide angle end state is illustrated in an upper part denoted by "WIDE", and a telephoto end state is illustrated in a lower part denoted by "TELE". As the luminous flux, axial luminous flux wa and luminous flux wb of the maximum angle of view in the wide angle end state and axial luminous flux to and luminous flux tb of the maximum angle of view in the telephoto end state are illustrated in FIG. 3. In the cross-sectional view of FIG. 1, FIG. 2, and FIG. 3, a left side is the object side, and a right side is the image side.

The extender lens EX consists of, in order from the object side to the image side, a first lens group G1 that has a positive refractive power as a whole, and a second lens group G2 that has a negative refractive power as a whole and is separated from the first lens group G1 at an air interval. The first lens group G1 is a lens group that has a positive refractive power as a whole and has the shortest focal length among lens groups consisting of one lens component or a plurality of consecutively arranged lens components. Here, the "lens component" is a lens having only two air contact surfaces including a surface on the object side and a surface on the image side on the optical axis. One lens component is one single lens or one cemented lens. By employing a telephoto type configuration as described above, it is easy to provide the extender lens EX with an effect of achieving a long focal length.

A definition of the first lens group G1 will be described in detail with reference to FIG. 2. The extender lens EX in the example in FIG. 2 consists of, in order from the object side to the image side, a cemented lens in which a lens L11 and a lens L12 are cemented, a lens L13 that is a single lens, a cemented lens in which a lens L14 and a lens L15 are cemented, a cemented lens in which a lens L21 and a lens L22 are cemented, and a lens 23 that is a single lens. In the case of dividing the extender lens EX in the example in FIG. 2 into two lens groups about the air interval as a boundary, four lens groups including a lens group consisting of the lenses L11 and L12, a lens group consisting of the lenses L11, L12, and L13, a lens group consisting of the lenses L11, L12, L13, L14, and L15, and a lens group consisting of the lenses L11, L12, L13, L14, L15, L21, and L22 are considered as a lens group that includes a lens of the extender lens EX closest to the object side and consists of one lens component or a plurality of consecutively arranged lens components. In a case where a focal length of each of the four lens groups is obtained in the example in FIG. 2, a lens group that has a positive refractive power as a whole and has the shortest focal length among the four lens groups is the lens group consisting of the lenses L11 to L15. Accordingly, in the example in FIG. 2, the first lens group G1 is composed of the lenses L11 to L15, and the second lens group G2 is composed of lenses L21 to L23 that are the remaining lenses.

In a case where a focal length of the first lens group G1 is denoted by f1 and a distance from a surface of the extender lens EX closest to the object side to a surface of the extender lens EX closest to the image side on the optical axis is denoted by TLex, the extender lens EX is configured to satisfy Conditional Expression (1) below. By satisfying Conditional Expression (1) not to be below a lower limit thereof, the refractive power of the first lens group G1 is not excessively decreased. Thus, it is easy to achieve a long focal length. Alternatively, the total length of the extender lens EX is not excessively decreased. Thus, it is easy to perform favorable aberration correction. By satisfying Conditional Expression (1) not to be above an upper limit thereof, the refractive power of the first lens group G1 is not excessively increased. Accordingly, the refractive power of the second lens group G2 is also not excessively increased, and it is easy to perform favorable aberration correction. Alternatively, the total length of the extender lens EX is not excessively increased. Thus, the extender lens EX can be confined within a defined range in the master lens. Furthermore, in a case where it is configured to satisfy Conditional Expression (1-1) below, more favorable characteristics can be achieved.

$$0.1 < TLex/f1 < 0.36 \quad (1)$$

$$0.15 < TLex/f1 < 0.33 \quad (1\text{-}1)$$

Next, a preferable configuration of the extender lens EX will be described. In a case where a focal length of the second lens group G2 is denoted by f2 and a focal length of the extender lens EX is denoted by fex, it is preferable to satisfy Conditional Expression (2) below. By satisfying Conditional Expression (2) not to be below a lower limit thereof, the focal length of the second lens group G2 is not excessively decreased. Thus, since a state where a position of a principal point of the extender lens EX on the image side is moved to the object side can be suppressed, likelihood of a state where an image forming position of the entire lens system after replacement is moved to the object side from an image forming position of the master lens ML before replacement can be suppressed. By satisfying Conditional Expression (2) not to be above an upper limit thereof, the focal length of the second lens group G2 is not excessively increased. Thus, since a state where the position of the principal point of the extender lens EX on the image side is positioned further on the image side can be suppressed, likelihood of a state where the image forming position of the entire lens system after replacement is moved to the image side from the image forming position of the master lens ML before replacement can be suppressed. By satisfying Conditional Expression (2), it is easy to match the image forming position of the entire lens system after replacement to the image forming position of the master lens ML. Furthermore, in a case where it is configured to satisfy Conditional Expression (2-1) below, more favorable characteristics can be achieved.

$$0.23 < f2/fex < 0.5 \quad (2)$$

$$0.24 < f2/fex < 0.46 \quad (2\text{-}1)$$

In a case where the focal length of the first lens group G1 is denoted by f1 and the focal length of the extender lens EX is denoted by fex, it is preferable to satisfy Conditional Expression (3) below. By satisfying Conditional Expression (3) not to be below a lower limit thereof, the refractive power of the first lens group G1 is not excessively increased. Thus, overcorrection of spherical aberration, axial chromatic aberration, and field curvature can be suppressed. By satisfying Conditional Expression (3) not to be above an upper limit thereof, the refractive power of the first lens group G1 is not excessively decreased. Thus, insufficient correction of the spherical aberration, the axial chromatic aberration, and the field curvature can be suppressed. By satisfying Conditional Expression (3), it is easy to match the image forming position of the entire lens system after replacement to the image forming position of the master lens ML while having an advantage in correction of the spherical aberration, the axial chromatic aberration, and the field curvature. Furthermore, in a case where it is configured to satisfy Conditional Expression (3-1) below, more favorable characteristics can be achieved.

$$-1 < f1/fex < -0.25 \quad (3)$$

$$-1 < f1/fex < -0.35 \quad (3\text{-}1)$$

It is preferable that the first lens group G1 includes a lens of which a surface on the object side has a convex surface, and in a case where a radius of curvature of a surface on the object side is denoted by Rf and a radius of curvature of a surface on the image side is denoted by Rr for at least one lens of the first lens group G1 of which the surface on the object side has a convex surface, Conditional Expression (8) below is satisfied. A lens of which a surface on the object side has a convex surface and that satisfies −0.08<(Rf−Rr)/(Rf+Rr)<0 is a positive lens. A lens of which a surface on the object side has a convex surface and that satisfies 0<(Rf−Rr)/(Rf+Rr)<0.05 is a negative lens. By satisfying Conditional Expression (8) not to be below a lower limit thereof, a tendency of undercorrected astigmatism can be suppressed, and an advantage in securing favorable optical characteristics is achieved. By satisfying Conditional Expression (8) not to be above an upper limit thereof, a negative refractive power is not excessively increased. Thus, overcorrection of the spherical aberration can be suppressed, and particularly, correction related to a marginal ray is easily performed. By satisfying Conditional Expression (8), an advantage in correcting a tangential image plane is achieved. Furthermore, in a case where it is configured to satisfy Conditional Expression (8-1) below, more favorable characteristics can be achieved.

$$-0.08 < (Rf-Rr)/(Rf+Rr) < 0.05 \quad (8)$$

$$-0.07 < (Rf-Rr)/(Rf+Rr) < 0.03 \quad (8\text{-}1)$$

It is preferable that the first lens group G1 further includes a cemented lens in which a negative lens and a positive lens are cemented, in addition to the lens of which the surface on the object side has a convex surface and that satisfies Conditional Expression (8). Generally, the extender lens EX is mostly arranged in the image forming unit RL of the master lens ML comprising the focusing unit F, the zooming unit V, and the image forming unit RL as described above. In this case, a diameter of luminous flux inside the extender lens EX tends to be greater on the object side than on the image side. That is, the diameter of the luminous flux in the second lens group G2 tends to be greater than the diameter of the luminous flux in the first lens group G1. By arranging the cemented lens and the lens of which the surface on the object side has a convex surface and that satisfies Conditional Expression (8), on the object side on which the diameter of the luminous flux is greater in the extender lens EX, an advantage in correcting the spherical aberration, the axial chromatic aberration, the astigmatism, and the field curvature is achieved.

More specifically, it is preferable that the first lens group G1 includes, consecutively in order from a side closest to the object side to the image side, a cemented lens in which a negative lens and a positive lens of which surfaces on the object side have convex surfaces are cemented in order from the object side, and the lens of which the surface on the object side has a convex surface and that satisfies Conditional Expression (8). By setting a lens surface of the first lens group G1 closest to the object side to be a convex surface, an effect of lowering a ray can be achieved. Thus, the spherical aberration is easily corrected in the first lens group G1. In addition, by setting a lens of the first lens group G1 closest to the object side to be a negative meniscus lens of which a surface on the object side has a convex surface, the axial chromatic aberration can be corrected on a cemented surface. Furthermore, by arranging the lens of which the surface on the object side has a convex surface and that satisfies Conditional Expression (8) at a position that is consecutive to the cemented lens on the image side and at which the diameter of the luminous flux is relatively great, the spherical aberration, the astigmatism, and the field curvature are easily corrected.

The second lens group G2 is configured to include a negative lens. In a case where a d line-based Abbe number of at least one negative lens of the second lens group G2 is denoted by vn, it is preferable to satisfy Conditional Expression (4) below. By satisfying Conditional Expression (4), an advantage in correcting first-order axial chromatic aberration is achieved. It is preferable to further satisfy Conditional Expression (4-1) for at least one negative lens of the second lens group G2. By satisfying Conditional Expression (4-1) not to be above an upper limit thereof, an excessive decrease in refractive index of the negative lens of the second lens group G2 can be suppressed. Thus, an advantage in correcting aberration is achieved.

$$60 < vn \quad (4)$$

$$60 < vn < 86 \quad (4\text{-}1)$$

In a case where a partial dispersion ratio between g line and F line is denoted by θgFn for at least one negative lens of the second lens group G2, it is preferable to satisfy Conditional Expression (5) below. By satisfying Conditional Expression (5), an advantage in correcting second-order axial chromatic aberration is achieved. Furthermore, in a case where it is configured to satisfy Conditional Expression (5-1) below, more favorable characteristics can be achieved.

$$0.64 < \theta gFn + 0.001625 \times vn < 0.7 \quad (5)$$

$$0.64 < \theta gFn + 0.001625 \times vn < 0.68 \quad (5\text{-}1)$$

For at least one negative lens of the second lens group G2, it is preferable to satisfy Conditional Expressions (4) and (5), and it is more preferable to satisfy at least one of Conditional Expression (4-1) or (5-1) after satisfying Conditional Expressions (4) and (5).

In a case where the focal length of the second lens group G2 is denoted by f2 and a focal length of the negative lens of the second lens group G2 satisfying Conditional Expressions (4) and (5) is denoted by f2n, it is preferable that at least one negative lens satisfies Conditional Expression (6) below. By causing the negative lens satisfying Conditional Expressions (4) and (5) to satisfy Conditional Expression (6), a further advantage in correcting the axial chromatic aberration is achieved. Furthermore, in a case where it is configured to satisfy Conditional Expression (6-1) below, more favorable characteristics can be achieved.

$$0.1 < f2/f2n < 1.5 \quad (6)$$

$$0.15 < f2/f2n < 1 \quad (6\text{-}1)$$

Furthermore, in a case where a temperature coefficient of a relative refractive index of the negative lens of the second lens group G2 satisfying Conditional Expressions (4), (5), and (6) with respect to d line within a range of 20° C. to 40° C. is denoted by dN/dT, it is preferable that at least one negative lens satisfies Conditional Expression (7) below. By causing the negative lens satisfying Conditional Expressions (4), (5), and (6) to satisfy Conditional Expression (7), an advantage in correcting a focusing position of the entire lens system after replacement in a case where temperature is changed is achieved. The unit of dN/dT is ° C.$^{-1}$.

$$-7 \times 10^{-6} < dN/dT < -2 \times 10^{-6} \quad (7)$$

While the first lens group G1 consists of five lenses and the second lens group G2 consists of three lenses in the example in FIG. 2, the number of lenses constituting the first lens group G1 and the second lens group G2 can be set to a number different from the example illustrated in FIG. 2. In addition, the number of lens groups that are comprised in the master lens ML and are moved during zooming may be set to a number different from the example in FIG. 1. Furthermore, the master lens ML may be a zoom lens having a configuration different from the example in FIG. 1. In a case where the master lens ML is a zoom lens, the master lens ML has a configuration having high versatility. The master lens ML may also be a varifocal lens or a fixed focal point optical system.

The above preferable configurations and available configurations can be used in any combination and preferably, are appropriately selectively employed depending on required specifications.

Next, numerical value examples of the extender lens EX and the master lens ML according to the embodiment of the technology of the present disclosure will be described. The master lens ML of Example 1 and Example 2 described below is common, and the master lens ML of Example 3 and Example 4 is common.

EXAMPLE 1

Master Lens

A configuration diagram of the master lens ML of Example 1 is illustrated with reference sign ML in FIG. 1, and an illustration method and a configuration thereof are described above. Thus, a duplicate description will be partially omitted here. The master lens ML of Example 1 is a zoom lens and consists of, in order from the object side to the image side, the focusing unit F, the zooming unit V, the aperture stop St, and the image forming unit RL. The focusing unit F consists of, in order from the object side to the image side, two lenses that are fixed with respect to the image plane Sim during focusing, and one lens that is moved during focusing, and employs a floating focus type. The zooming unit V consists of, in order from the object side to the image side, the V1 lens group V1, the V2 lens group V2, and the V3 lens group V3. These three lens groups are moved by changing an interval with an adjacent lens group during zooming. The image forming unit RL consists of, in order from the object side to the image side, the RL1 lens group RL1, the RL2 lens group RL2, and the RL3 lens group RL3. The RL2 lens group RL2 is configured to be replaceable with the extender lens EX. Above is a summary of the master lens ML of Example 1.

For the master lens ML of Example 1, basic lens data is shown in Table 1A and Table 1B, specifications are shown in Table 2, a variable surface interval is shown in Table 3, and an aspherical coefficient is shown in Table 4. Here, the basic lens data is separately shown in two tables of Table 1A and Table 1B in order to avoid one lengthy table. Table 1A shows the focusing unit F and the zooming unit V, and Table 1B shows the aperture stop St, the image forming unit RL, and the optical member PP. In Table 1B, a column denoted by "RL2" is added to a left side of a surface number corresponding to the RL2 lens group RL2.

In Table 1A and Table 1B, a column of Sn shows a surface number in a case where the number is increased one at a time in a direction of the image side by regarding a surface closest to the object side as a first surface. A column of R shows a radius of curvature of each surface. A column of D shows a surface interval on the optical axis between each surface and a surface adjacent thereto on the image side. A column of Nd shows a refractive index of each constituent with respect to d line. A column of vd shows a d line-based Abbe number of each constituent. A column of θgF shows a partial dispersion ratio of each constituent between g line and F line.

In Table 1A and Table 1B, a sign of a radius of curvature of a surface having a shape of a convex surface toward the object side is positive, and a sign of a radius of curvature of a surface having a shape of a convex surface toward the image side is negative. In Table 1B, a surface number and a text (St) are written in the column of the surface number of a surface corresponding to the aperture stop St. In Table 1A and Table 1B, a symbol DD[ ] is used for the variable surface interval during zooming and is written in the column of D by adding a surface number on the object side of the interval to the inside of [ ].

Table 2 shows a zoom magnification Zr, a focal length f, an F number FNo., and a maximum total angle of view 2ω based on d line. In a column of 2ω, (°) means that a unit is degree. Table 3 shows the variable surface interval during zooming based on d line. In Table 2 and Table 3, each value in the wide angle end state and the telephoto end state is shown in columns denoted by WIDE and TELE, respectively.

In the basic lens data, a surface number of an aspherical surface is marked with *, and a numerical value of a paraxial radius of curvature is written in the column of the radius of curvature of the aspherical surface. In Table 4, a column of Sn shows the surface number of the aspherical surface, and columns of KA and Am show a numerical value of the aspherical coefficient for each aspherical surface. In the numerical value of the aspherical coefficient in Table 4, "E±n" (n: integer) means "×10±n". KA and Am are aspherical coefficients in an aspherical surface expression represented by the following expression. Here, m is an integer greater than or equal to 3 and varies depending on surfaces. For example, m=3, 4, 5, . . . , 10 for a surface 11 in Table 4.

$$Zd = C \times h^2 / \{1 + (1 - KA \times C^2 \times h^2)^{1/2}\} + \Sigma Am \times h^m$$

where

Zd: aspherical depth (length of a perpendicular line drawn from a point on an aspherical surface of a height h to a plane that passes through an aspherical vertex and is perpendicular to the optical axis)

h: height (distance from the optical axis to the lens surface)

C: reciprocal of the paraxial radius of curvature

KA and Am: aspherical coefficients

In the aspherical expression, Σ means a total sum related to m.

In data of each table, degree is used as a unit of angle, and millimeter (mm) is used as a unit of length. However, since the optical system can be used even in a case where the optical system is proportionally enlarged or proportionally reduced, other appropriate units can also be used. Numerical values rounded in predetermined digits are written in each table shown below.

TABLE 1A

Master Lens of Example 1

| Sn | R | D | Nd | vd | θgF |
|---|---|---|---|---|---|
| 1 | 2149.2163 | 4.4000 | 1.83400 | 37.16 | 0.57759 |
| 2 | 364.4008 | 1.8100 | | | |
| 3 | 357.1559 | 24.5800 | 1.43387 | 95.18 | 0.53733 |
| 4 | −629.0299 | 32.8500 | | | |
| 5 | 363.8700 | 15.6200 | 1.43387 | 95.18 | 0.53733 |

TABLE 1A-continued

Master Lens of Example 1

| Sn | R | D | Nd | vd | θgF |
|---|---|---|---|---|---|
| 6 | ∞ | 0.1200 | | | |
| 7 | 310.1672 | 17.8400 | 1.43387 | 95.18 | 0.53733 |
| 8 | ∞ | 2.9000 | | | |
| 9 | 173.0993 | 14.6700 | 1.43875 | 94.94 | 0.53433 |
| 10 | 310.0848 | DD[10] | | | |
| *11 | 109963.7968 | 2.8000 | 1.90366 | 31.31 | 0.59481 |
| 12 | 56.5266 | 8.6300 | | | |
| 13 | −84.6070 | 1.6000 | 2.00100 | 29.13 | 0.59952 |
| 14 | 321.4052 | 6.6700 | | | |
| 15 | −62.2824 | 1.6000 | 1.95375 | 32.32 | 0.59015 |
| 16 | 115.4560 | 6.9400 | 1.89286 | 20.36 | 0.63944 |
| 17 | −73.9497 | 0.1200 | | | |
| 18 | 962.3821 | 7.7100 | 1.80518 | 25.43 | 0.61027 |
| 19 | −51.3780 | 1.6200 | 1.80400 | 46.58 | 0.55730 |
| 20 | 2303.8825 | DD[20] | | | |
| 21 | 170.3657 | 9.7800 | 1.49700 | 81.54 | 0.53748 |
| *22 | −209.1383 | DD[22] | | | |
| 23 | 137.4359 | 11.9100 | 1.43700 | 95.10 | 0.53364 |
| 24 | −175.8090 | 2.0000 | 1.59270 | 35.31 | 0.59336 |
| 25 | −597.2019 | 0.2500 | | | |
| *26 | 188.3526 | 9.3100 | 1.43700 | 95.10 | 0.53364 |
| 27 | −195.4929 | 0.1200 | | | |
| 28 | 247.3158 | 2.0000 | 1.80000 | 29.84 | 0.60178 |
| 29 | 94.0850 | 12.0500 | 1.43700 | 95.10 | 0.53364 |
| 30 | −217.6314 | DD[30] | | | |

TABLE 1B

Master Lens of Example 1

| | Sn | R | D | Nd | vd | θgF |
|---|---|---|---|---|---|---|
| | 31 (St) | ∞ | 5.0700 | | | |
| | 32 | −188.3440 | 1.4000 | 1.77250 | 49.60 | 0.55212 |
| | 33 | 62.0923 | 0.1200 | | | |
| | 34 | 43.4903 | 4.5500 | 1.80518 | 25.42 | 0.61616 |
| | 35 | 151.4362 | 2.0300 | | | |
| | 36 | −188.3403 | 1.4000 | 1.48749 | 70.24 | 0.53007 |
| | 37 | 72.1812 | 9.2600 | | | |
| RL2 | 38 | −50.3918 | 3.2500 | 1.80440 | 39.59 | 0.57297 |
| | 39 | 63.9800 | 8.1300 | 1.80518 | 25.43 | 0.61027 |
| | 40 | −46.8126 | 0.3400 | | | |
| | 41 | −50.8827 | 1.6600 | 1.95375 | 32.32 | 0.59015 |
| | 42 | 56.9580 | 7.3800 | 1.72916 | 54.68 | 0.54451 |
| | 43 | −73.6910 | 0.1200 | | | |
| | 44 | 215.7126 | 10.9800 | 1.73800 | 32.26 | 0.58995 |
| | 45 | −215.7126 | 8.8100 | | | |
| | 46 | 182.7540 | 17.0600 | 1.67003 | 47.23 | 0.56276 |
| | 47 | −103.9363 | 0.1200 | | | |
| | 48 | 148.7010 | 2.9000 | 1.95375 | 32.32 | 0.59015 |
| | 49 | 44.8210 | 0.8500 | | | |
| | 50 | 44.9406 | 10.1300 | 1.51633 | 64.14 | 0.53531 |
| | 51 | −64.7286 | 0.1200 | | | |
| | 52 | 65.6410 | 5.1900 | 1.48749 | 70.24 | 0.53007 |
| | 53 | −65.6410 | 1.8500 | 1.95375 | 32.32 | 0.59015 |
| | 54 | ∞ | 0.2500 | | | |
| | 55 | ∞ | 1.0000 | 1.51633 | 64.14 | 0.53531 |
| | 56 | ∞ | 11.8229 | | | |
| | 57 | ∞ | 33.0000 | 1.60859 | 46.44 | 0.56664 |
| | 58 | ∞ | 13.2000 | 1.51633 | 64.05 | 0.53463 |
| | 59 | ∞ | 5.5064 | | | |

TABLE 2

Master Lens of Example 1

|  | WIDE | TELE |
|---|---|---|
| Zr | 1.0 | 76.8 |
| f | 9.31 | 714.87 |
| FNo. | 1.76 | 3.63 |
| 2ω (°) | 65.0 | 0.8 |

TABLE 3

Master Lens of Example 1

|  | WIDE | TELE |
|---|---|---|
| DD[10] | 2.9805 | 191.1402 |
| DD[20] | 291.0607 | 3.9921 |
| DD[22] | 1.4039 | 1.9940 |
| DD[30] | 3.1416 | 101.4605 |

TABLE 4

Master Lens of Example 1

| Sn | 11 | 22 | 26 |
|---|---|---|---|
| KA | 1.0000000E+00 | 1.0000000E+00 | 1.0000000E+00 |
| A3 | 1.8505954E−21 | −7.1721817E−22 | 6.6507804E−22 |
| A4 | 4.0660287E−07 | 1.6421968E−07 | −2.8081272E−07 |
| A5 | −6.4796240E−09 | −5.6511999E−09 | −8.0962001E−09 |
| A6 | 8.4021729E−10 | 1.7414539E−10 | 2.8172499E−10 |
| A7 | −4.5016908E−11 | 7.4176985E−13 | −1.6052722E−12 |
| A8 | 4.3463314E−13 | −9.7299399E−14 | −1.0541094E−13 |
| A9 | 3.5919548E−14 | 1.1281878E−15 | 2.1399424E−15 |
| A10 | −8.9257498E−16 | −4.4848875E−19 | −1.0917621E−17 |

Figure 4:
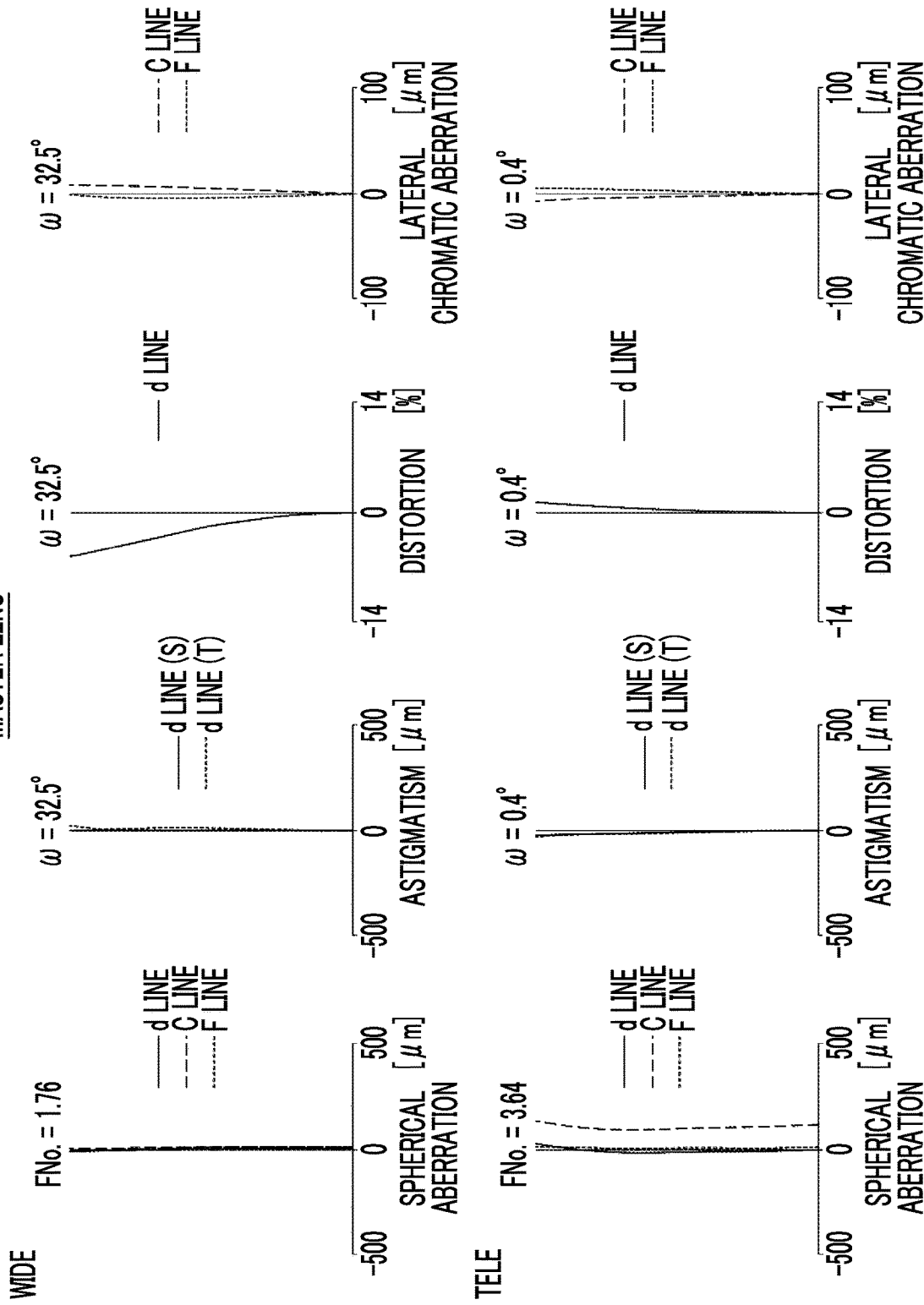
FIG. 4 is each aberration diagram of the master lens of Example 1.

FIG. 4 illustrates each aberration diagram of the master lens ML of Example 1 in a state where an object at infinity is focused. In FIG. 4, the spherical aberration, the astigmatism, distortion, and lateral chromatic aberration are illustrated in order from the left. In FIG. 4, aberration in the wide angle end state is illustrated in an upper part denoted by "WIDE", and aberration in the telephoto end state is illustrated in a lower part denoted by "TELE". In the spherical aberration diagram, aberration on d line, C line, and F line is illustrated by a solid line, a long-dashed line, and a short-dashed line, respectively. In the astigmatism diagram, aberration on d line in a sagittal direction is illustrated by a solid line, and aberration on d line in a tangential direction is illustrated by a short-dashed line. In the distortion diagram, aberration on d line is illustrated by a solid line. In the lateral chromatic aberration diagram, aberration on C line and F line is illustrated by a long-dashed line and a short-dashed line, respectively. In the spherical aberration diagram, FNo. means the F number. In other aberration diagrams, ω means a half angle of view.

Symbols, meanings, writing methods, and illustration methods of each data above are the same in the following examples unless otherwise specified. Thus, a duplicate description will be omitted below.

Entire Lens System After Replacement With Extender Lens

The extender lens EX of Example 1 is configured to be capable of replacing the RL2 lens group RL2 of the master lens ML. A configuration of the extender lens EX of Example 1 is illustrated in FIG. 2. FIG. 3 illustrates a configuration of the entire lens system after replacement of the RL2 lens group RL2 with the extender lens EX and the luminous flux at the wide angle end and the telephoto end. Illustration methods and configurations of FIG. 2 and FIG. 3 are the same as described above. Thus, a duplicate description will be partially omitted. The extender lens EX of Example 1 consists of, in order from the object side to the image side, the first lens group G1 that has a positive refractive power as a whole, and the second lens group G2 that has a negative refractive power as a whole. The first lens group G1 consists of the lenses L11 to L15, and the second lens group G2 consists of the lenses L21 to L23.

Figure 5:
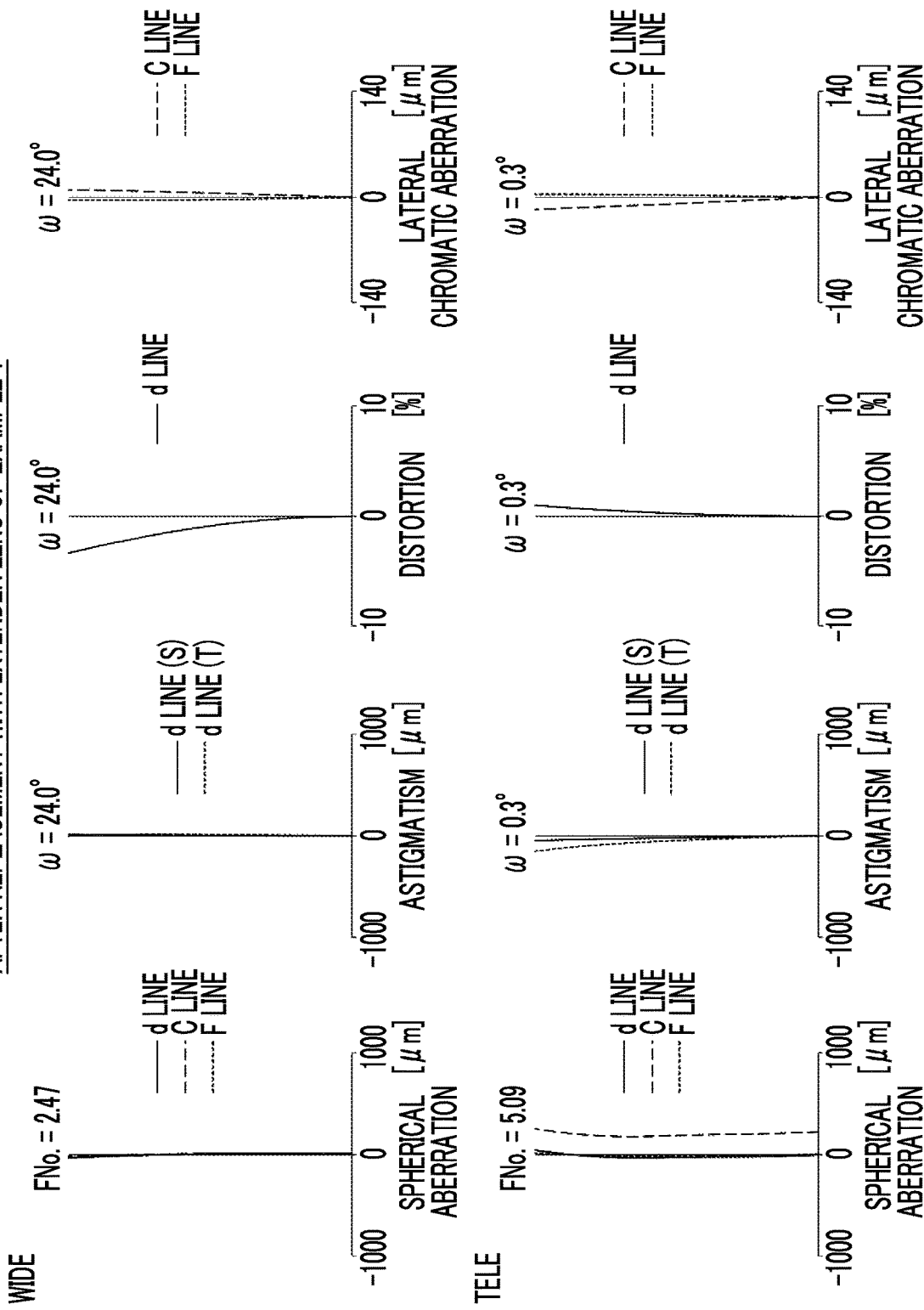
FIG. 5 is each aberration diagram of the entire lens system after replacement with the extender lens of Example 1.

For the entire lens system after replacement with the extender lens EX, basic lens data is shown in Table 5A and Table 5B, specifications are shown in Table 6, and each aberration diagram is illustrated in FIG. 5. Table 5A shows the focusing unit F and the zooming unit V, and Table 5B shows the aperture stop St, the RL1 lens group RL1, the extender lens EX, the RL3 lens group RL3, and the optical member PP. In Table 5B, a column denoted by "EX" is added to a left side of a surface number corresponding to the extender lens EX. This representation method also applies to the following examples. Data in Table 5A is the same as the data in Table 1A. The variable surface interval and the aspherical coefficient of the aspherical surface related to the data in Table 5A are the same as the values shown in Table 3 and Table 4, respectively, and thus, will not be described here.

TABLE 5A

After Replacement With Extender Lens of Example 1

| Sn | R | D | Nd | vd | θgF |
|---|---|---|---|---|---|
| 1 | 2149.2163 | 4.4000 | 1.83400 | 37.16 | 0.57759 |
| 2 | 364.4008 | 1.8100 |  |  |  |
| 3 | 357.1559 | 24.5800 | 1.43387 | 95.18 | 0.53733 |
| 4 | −629.0299 | 32.8500 |  |  |  |
| 5 | 363.8700 | 15.6200 | 1.43387 | 95.18 | 0.53733 |
| 6 | ∞ | 0.1200 |  |  |  |
| 7 | 310.1672 | 17.8400 | 1.43387 | 95.18 | 0.53733 |
| 8 | ∞ | 2.9000 |  |  |  |
| 9 | 173.0993 | 14.6700 | 1.43875 | 94.94 | 0.53433 |
| 10 | 310.0848 | DD[10] |  |  |  |
| *11 | 109963.7968 | 2.8000 | 1.90366 | 31.31 | 0.59481 |
| 12 | 56.5266 | 8.6300 |  |  |  |
| 13 | −84.6070 | 1.6000 | 2.00100 | 29.13 | 0.59952 |
| 14 | 321.4052 | 6.6700 |  |  |  |
| 15 | −62.2824 | 1.6000 | 1.95375 | 32.32 | 0.59015 |
| 16 | 115.4560 | 6.9400 | 1.89286 | 20.36 | 0.63944 |
| 17 | −73.9497 | 0.1200 |  |  |  |
| 18 | 962.3821 | 7.7100 | 1.80518 | 25.43 | 0.61027 |
| 19 | −51.3780 | 1.6200 | 1.80400 | 46.58 | 0.55730 |
| 20 | 2303.8825 | DD[20] |  |  |  |
| 21 | 170.3657 | 9.7800 | 1.49700 | 81.54 | 0.53748 |
| *22 | −209.1383 | DD[22] |  |  |  |
| 23 | 137.4359 | 11.9100 | 1.43700 | 95.10 | 0.53364 |
| 24 | −175.8090 | 2.0000 | 1.59270 | 35.31 | 0.59336 |
| 25 | −597.2019 | 0.2500 |  |  |  |
| *26 | 188.3526 | 9.3100 | 1.43700 | 95.10 | 0.53364 |
| 27 | −195.4929 | 0.1200 |  |  |  |
| 28 | 247.3158 | 2.0000 | 1.80000 | 29.84 | 0.60178 |
| 29 | 94.0850 | 12.0500 | 1.43700 | 95.10 | 0.53364 |
| 30 | −217.6314 | DD[30] |  |  |  |

TABLE 5B

After Replacement With Extender Lens of Example 1

| Sn | R | D | Nd | vd | θgF |
|---|---|---|---|---|---|
| 31 (St) | ∞ | 5.0700 |  |  |  |
| 32 | −188.3440 | 1.4000 | 1.77250 | 49.60 | 0.55212 |
| 33 | 62.0923 | 0.1200 |  |  |  |

TABLE 5B-continued

After Replacement With Extender Lens of Example 1

| | Sn | R | D | Nd | vd | θgF |
|---|---|---|---|---|---|---|
| | 34 | 43.4903 | 4.5500 | 1.80518 | 25.42 | 0.61616 |
| | 35 | 151.4362 | 2.0300 | | | |
| | 36 | −188.3403 | 1.4000 | 1.48749 | 70.24 | 0.53007 |
| | 37 | 72.1812 | 6.7090 | | | |
| EX | 38 | 52.2964 | 1.0998 | 1.96300 | 24.11 | 0.62126 |
| | 39 | 28.1811 | 3.6503 | 1.80100 | 34.97 | 0.58642 |
| | 40 | 53.1739 | 0.1897 | | | |
| | 41 | 26.2342 | 2.4007 | 1.51633 | 64.14 | 0.53531 |
| | 42 | 25.3036 | 9.7447 | | | |
| | 43 | 171.0309 | 2.8426 | 1.80518 | 25.45 | 0.61571 |
| | 44 | −94.7666 | 1.0098 | 1.55232 | 63.46 | 0.53656 |
| | 45 | −129.6838 | 0.9521 | | | |
| | 46 | −131.3818 | 1.8000 | 1.80400 | 46.58 | 0.55730 |
| | 47 | −116.4979 | 1.0098 | 1.77250 | 49.60 | 0.55212 |
| | 48 | 152.9538 | 6.3217 | | | |
| | 49 | 96.4049 | 1.9975 | 1.51860 | 69.89 | 0.53184 |
| | 50 | −195.9087 | 10.2123 | | | |
| | 51 | 182.7540 | 17.0600 | 1.67003 | 47.23 | 0.56276 |
| | 52 | −103.9363 | 0.1200 | | | |
| | 53 | 148.7010 | 2.9000 | 1.95375 | 32.32 | 0.59015 |
| | 54 | 44.8210 | 0.8500 | | | |
| | 55 | 44.9406 | 10.1300 | 1.51633 | 64.14 | 0.53531 |
| | 56 | −64.7286 | 0.1200 | | | |
| | 57 | 65.6410 | 5.1900 | 1.48749 | 70.24 | 0.53007 |
| | 58 | −65.6410 | 1.8500 | 1.95375 | 32.32 | 0.59015 |
| | 59 | ∞ | 0.2500 | | | |
| | 60 | ∞ | 1.0000 | 1.51633 | 64.14 | 0.53531 |
| | 61 | ∞ | 11.8114 | | | |
| | 62 | ∞ | 33.0000 | 1.60859 | 46.44 | 0.56664 |
| | 63 | ∞ | 13.1200 | 1.51633 | 64.05 | 0.53463 |
| | 64 | ∞ | 5.4976 | | | |

TABLE 6

After Replacement With Extender Lens of Example 1

| | WIDE | TELE |
|---|---|---|
| Zr | 1.0 | 76.8 |
| f | 13.03 | 1000.98 |
| FNo. | 2.47 | 5.09 |
| 2ω (°) | 48.0 | 0.6 |

EXAMPLE 2

Master Lens

The master lens ML of Example 2 is in common with the master lens ML of Example 1. Thus, a duplicate description of data will be omitted.

Entire Lens System After Replacement With Extender Lens

Figure 6:
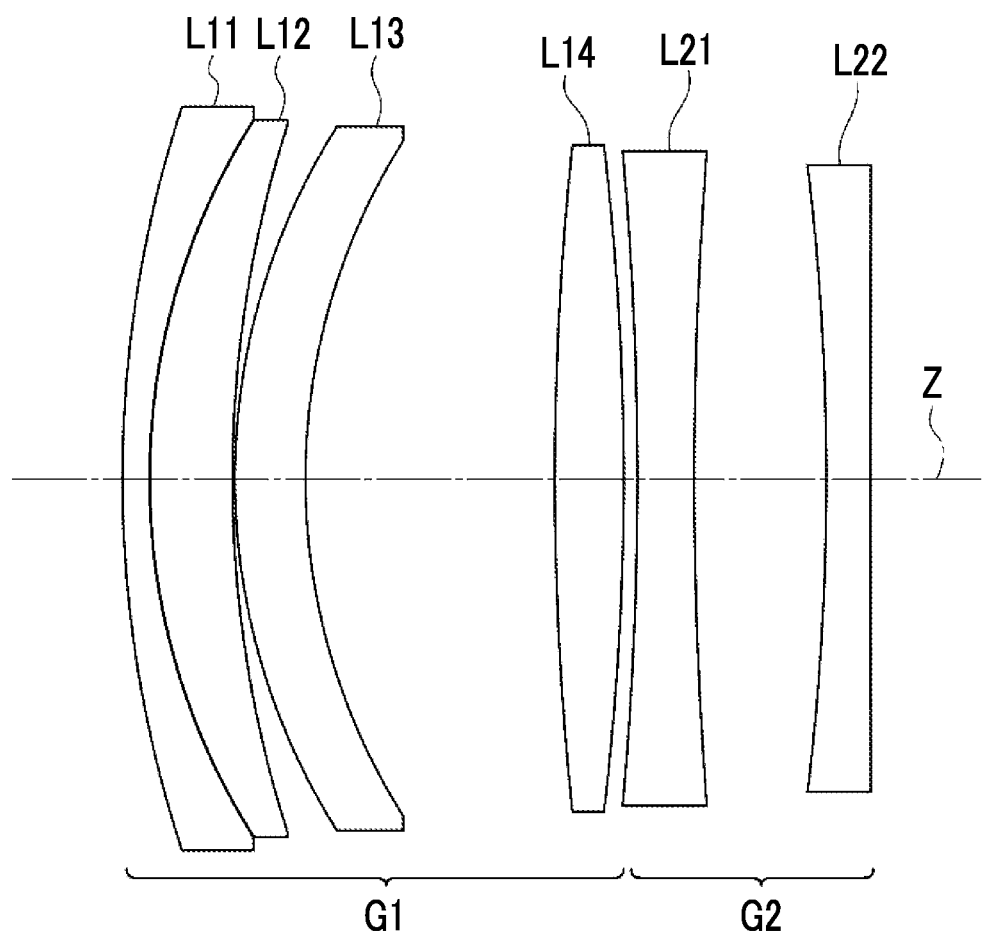
FIG. 6 is a cross-sectional configuration diagram of an extender lens of Example 2.

The extender lens EX of Example 2 is configured to be capable of replacing the RL2 lens group RL2 of the master lens ML. A configuration of the extender lens EX of Example 2 is illustrated in FIG. 6. The extender lens EX of Example 2 consists of, in order from the object side to the image side, the first lens group G1 that has a positive refractive power as a whole, and the second lens group G2 that has a negative refractive power as a whole. The first lens group G1 consists of the lenses L11 to L14, and the second lens group G2 consists of the lenses L21 and L22.

Figure 7:
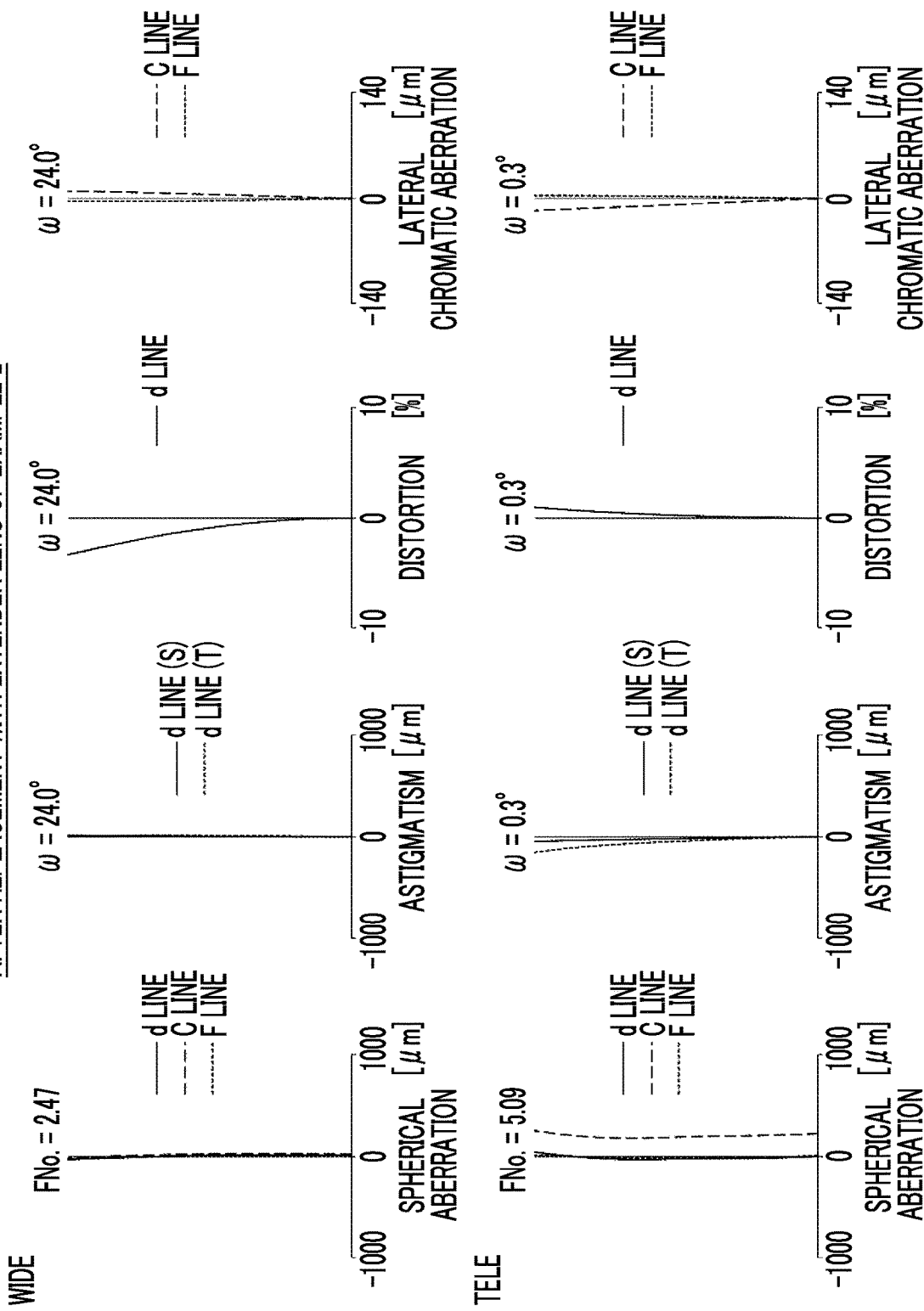
FIG. 7 is each aberration diagram of the entire lens system after replacement with the extender lens of Example 2.

For the entire lens system after replacement with the extender lens EX, basic lens data is shown in Table 7A and Table 7B, specifications are shown in Table 8, and each aberration diagram is illustrated in FIG. 7. Table 7A shows the focusing unit F and the zooming unit V, and Table 7B shows the aperture stop St, the RL1 lens group RL1, the extender lens EX, the RL3 lens group RL3, and the optical member PP. Data in Table 7A is the same as the data in Table 1A. The variable surface interval and the aspherical coefficient of the aspherical surface related to the data in Table 7A are the same as the values shown in Table 3 and Table 4, respectively, and thus, will not be described here.

TABLE 7A

After Replacement With Extender Lens of Example 2

| Sn | R | D | Nd | vd | θgF |
|---|---|---|---|---|---|
| 1 | 2149.2163 | 4.4000 | 1.83400 | 37.16 | 0.57759 |
| 2 | 364.4008 | 1.8100 | | | |
| 3 | 357.1559 | 24.5800 | 1.43387 | 95.18 | 0.53733 |
| 4 | −629.0299 | 32.8500 | | | |
| 5 | 363.8700 | 15.6200 | 1.43387 | 95.18 | 0.53733 |
| 6 | ∞ | 0.1200 | | | |
| 7 | 310.1672 | 17.8400 | 1.43387 | 95.18 | 0.53733 |
| 8 | ∞ | 2.9000 | | | |
| 9 | 173.0993 | 14.6700 | 1.43875 | 94.94 | 0.53433 |
| 10 | 310.0848 | DD[10] | | | |
| *11 | 109963.7968 | 2.8000 | 1.90366 | 31.31 | 0.59481 |
| 12 | 56.5266 | 8.6300 | | | |
| 13 | −84.6070 | 1.6000 | 2.00100 | 29.13 | 0.59952 |
| 14 | 321.4052 | 6.6700 | | | |
| 15 | −62.2824 | 1.6000 | 1.95375 | 32.32 | 0.59015 |
| 16 | 115.4560 | 6.9400 | 1.89286 | 20.36 | 0.63944 |
| 17 | −73.9497 | 0.1200 | | | |
| 18 | 962.3821 | 7.7100 | 1.80518 | 25.43 | 0.61027 |
| 19 | −51.3780 | 1.6200 | 1.80400 | 46.58 | 0.55730 |
| 20 | 2303.8825 | DD[20] | | | |
| 21 | 170.3657 | 9.7800 | 1.49700 | 81.54 | 0.53748 |
| *22 | −209.1383 | DD[22] | | | |
| 23 | 137.4359 | 11.9100 | 1.43700 | 95.10 | 0.53364 |
| 24 | −175.8090 | 2.0000 | 1.59270 | 35.31 | 0.59336 |
| 25 | −597.2019 | 0.2500 | | | |
| *26 | 188.3526 | 9.3100 | 1.43700 | 95.10 | 0.53364 |
| 27 | −195.4929 | 0.1200 | | | |
| 28 | 247.3158 | 2.0000 | 1.80000 | 29.84 | 0.60178 |
| 29 | 94.0850 | 12.0500 | 1.43700 | 95.10 | 0.53364 |
| 30 | −217.6314 | DD[30] | | | |

TABLE 7B

After Replacement With Extender Lens of Example 2

| | Sn | R | D | Nd | vd | θgF |
|---|---|---|---|---|---|---|
| | 31 (St) | ∞ | 5.0700 | | | |
| | 32 | −188.3440 | 1.4000 | 1.77250 | 49.60 | 0.55212 |
| | 33 | 62.0923 | 0.1200 | | | |
| | 34 | 43.4903 | 4.5500 | 1.80518 | 25.42 | 0.61616 |
| | 35 | 151.4362 | 2.0300 | | | |
| | 36 | −188.3403 | 1.4000 | 1.48749 | 70.24 | 0.53007 |
| | 37 | 72.1812 | 6.6343 | | | |
| EX | 38 | 50.5185 | 1.1001 | 1.96300 | 24.11 | 0.62126 |
| | 39 | 28.3495 | 3.3834 | 1.80100 | 34.97 | 0.58642 |
| | 40 | 49.4187 | 0.1001 | | | |
| | 41 | 27.8599 | 2.8758 | 1.51633 | 64.14 | 0.53531 |
| | 42 | 26.7371 | 10.1325 | | | |
| | 43 | 135.9464 | 2.8013 | 1.80518 | 25.45 | 0.61571 |
| | 44 | −119.8207 | 0.5617 | | | |
| | 45 | −152.6062 | 2.3158 | 1.78800 | 47.37 | 0.55598 |
| | 46 | 179.9086 | 5.3913 | | | |
| | 47 | −110.4442 | 1.7999 | 1.49700 | 81.54 | 0.53748 |
| | 48 | 7021.6836 | 12.8439 | | | |
| | 49 | 182.7540 | 17.0600 | 1.67003 | 47.23 | 0.56276 |
| | 50 | −103.9363 | 0.1200 | | | |
| | 51 | 148.7010 | 2.9000 | 1.95375 | 32.32 | 0.59015 |
| | 52 | 44.8210 | 0.8500 | | | |
| | 53 | 44.9406 | 10.1300 | 1.51633 | 64.14 | 0.53531 |
| | 54 | −64.7286 | 0.1200 | | | |
| | 55 | 65.6410 | 5.1900 | 1.48749 | 70.24 | 0.53007 |
| | 56 | −65.6410 | 1.8500 | 1.95375 | 32.32 | 0.59015 |
| | 57 | ∞ | 0.2500 | | | |

TABLE 7B-continued

After Replacement With Extender Lens of Example 2

| Sn | R | D | Nd | vd | θgF |
|---|---|---|---|---|---|
| 58 | ∞ | 1.0000 | 1.51633 | 64.14 | 0.53531 |
| 59 | ∞ | 11.8136 | | | |
| 60 | ∞ | 33.0000 | 1.60859 | 46.44 | 0.56664 |
| 61 | ∞ | 13.2000 | 1.51633 | 64.05 | 0.53463 |
| 62 | ∞ | 5.4971 | | | |

TABLE 8

After Replacement With Extender Lens of Example 2

| | WIDE | TELE |
|---|---|---|
| Zr | 1.0 | 76.8 |
| f | 13.03 | 1000.88 |
| FNo. | 2.47 | 5.09 |
| 2ω (°) | 48.0 | 0.6 |

EXAMPLE 3

Master Lens

Figure 8:
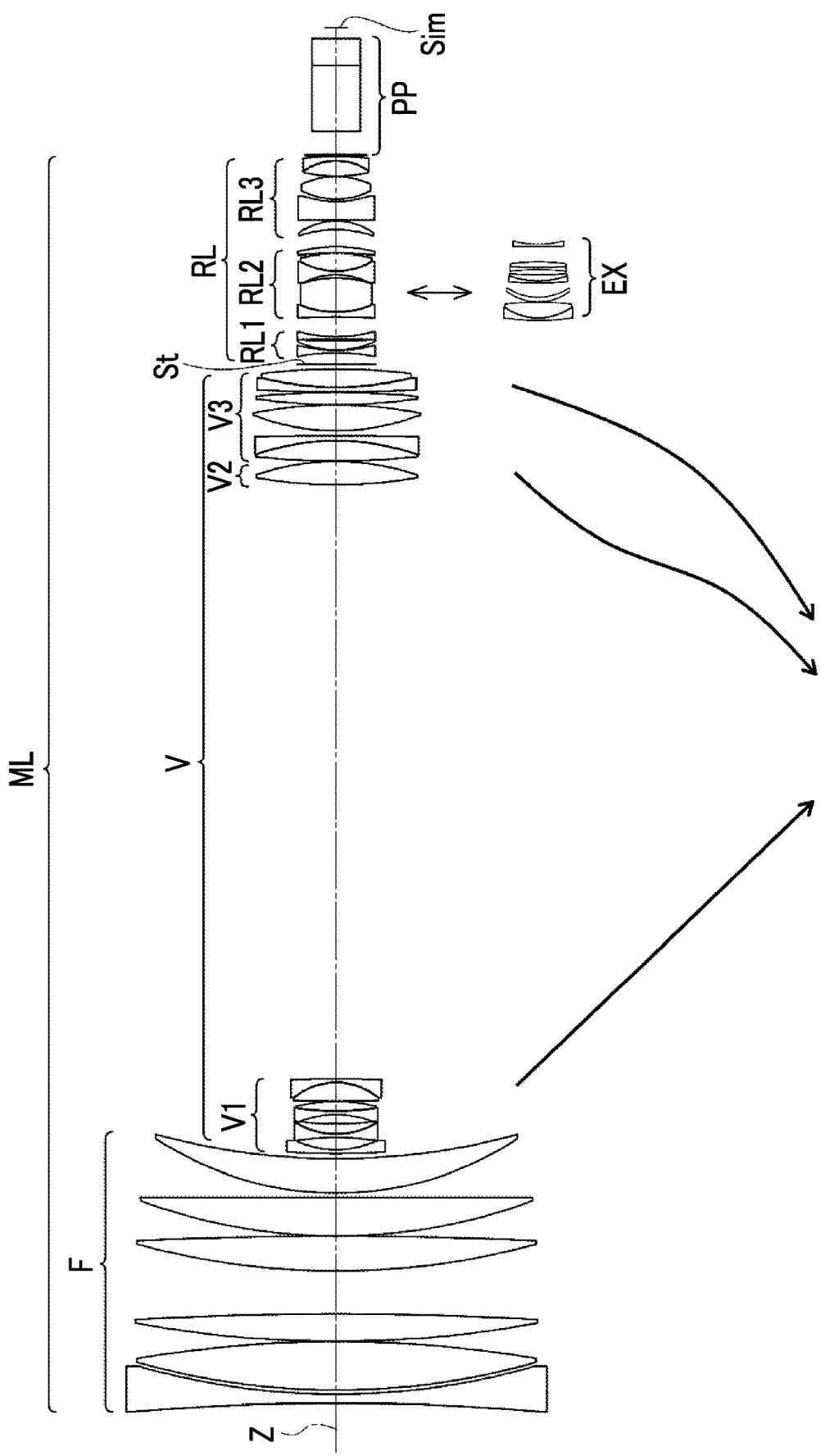
FIG. 8 is a diagram illustrating a cross-sectional view illustrating a configuration of a master lens and an extender lens of Example 3 and a movement trajectory.

FIG. 8 illustrates a configuration diagram of the master lens ML of Example 3 with reference sign ML. The master lens ML of Example 3 has the same configuration as the summary of the master lens ML of Example 1 except that three lenses are fixed during focusing of the focusing unit F.

Figure 11:
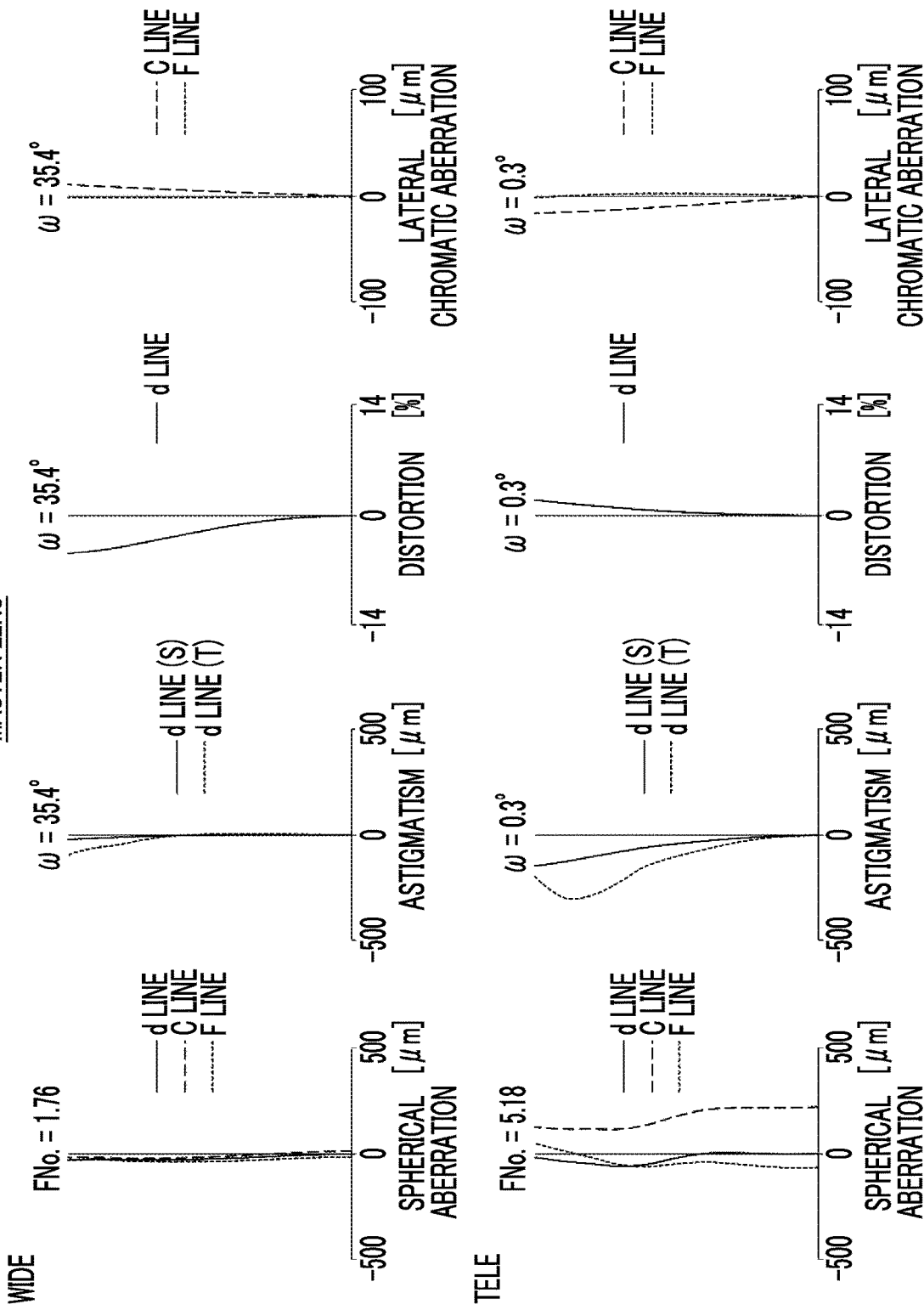
FIG. 11 is each aberration diagram of the master lens of Example 3.

For the master lens ML of Example 3, basic lens data is shown in Table 9A and Table 9B, specifications are shown in Table 10, the variable surface interval is shown in Table 11, the aspherical coefficient is shown in Table 12, and each aberration diagram is illustrated in FIG. 11. Table 9A shows the focusing unit F and the zooming unit V, and Table 9B shows the aperture stop St, the image forming unit RL, and the optical member PP.

TABLE 9A

Master Lens of Example 3

| Sn | R | D | Nd | vd | θgF |
|---|---|---|---|---|---|
| 1 | −1314.4474 | 4.4000 | 1.83481 | 42.73 | 0.56481 |
| 2 | 375.2221 | 2.0000 | | | |
| 3 | 380.9880 | 24.2200 | 1.43387 | 95.18 | 0.53733 |
| 4 | −619.1841 | 0.1200 | | | |
| 5 | 584.0999 | 13.6300 | 1.43387 | 95.18 | 0.53733 |
| 6 | −1937.2286 | 21.5200 | | | |
| 7 | 396.4376 | 17.3400 | 1.43387 | 95.18 | 0.53733 |
| 8 | −2314.5166 | 0.1200 | | | |
| 9 | 295.1601 | 19.2000 | 1.43700 | 95.10 | 0.53364 |
| 10 | ∞ | 2.1600 | | | |
| 11 | 172.6442 | 16.9400 | 1.43700 | 95.10 | 0.53364 |
| 12 | 358.6977 | DD[12] | | | |
| *13 | 935.9870 | 1.8000 | 1.90366 | 31.31 | 0.59481 |
| 14 | 50.7322 | 6.0100 | | | |
| 15 | −135.1019 | 1.8000 | 1.87070 | 40.73 | 0.56825 |
| 16 | 40.8080 | 4.9600 | 1.43700 | 95.10 | 0.53364 |
| 17 | 150.5936 | 4.6900 | | | |
| 18 | −53.0433 | 1.8000 | 1.89800 | 34.00 | 0.58703 |
| 19 | 136.7940 | 4.7200 | 1.89286 | 20.36 | 0.63944 |
| 20 | −96.8742 | 0.1400 | | | |
| 21 | 440.2141 | 9.3900 | 1.80518 | 25.45 | 0.61571 |
| 22 | −34.5600 | 1.8200 | 1.80400 | 46.53 | 0.55775 |
| 23 | −572.9080 | DD[23] | | | |
| 24 | 246.8758 | 11.6400 | 1.49700 | 81.54 | 0.53748 |
| *25 | −123.6093 | 0.1200 | | | |
| 26 | 416.6826 | 10.1100 | 1.43700 | 95.10 | 0.53364 |
| 27 | −127.8440 | 2.5200 | 1.59270 | 35.27 | 0.59363 |

TABLE 9A-continued

Master Lens of Example 3

| Sn | R | D | Nd | vd | θgF |
|---|---|---|---|---|---|
| 28 | −1862.3688 | DD[28] | | | |
| 29 | 120.0199 | 12.8100 | 1.43700 | 95.10 | 0.53364 |
| 30 | −225.9150 | 0.1200 | | | |
| *31 | 239.2747 | 6.1700 | 1.43700 | 95.10 | 0.53364 |
| 32 | −432.6555 | 0.2300 | | | |
| 33 | 884.5549 | 2.4100 | 1.85883 | 30.00 | 0.59793 |
| 34 | 162.5560 | 9.0500 | 1.43700 | 95.10 | 0.53364 |
| 35 | −316.4619 | DD[35] | | | |

TABLE 9B

Master Lens of Example 3

| | Sn | R | D | Nd | vd | θgF |
|---|---|---|---|---|---|---|
| | 36 (St) | ∞ | 5.7400 | | | |
| | 37 | −109.6023 | 1.3000 | 1.80100 | 34.97 | 0.58642 |
| | 38 | 82.2928 | 0.1200 | | | |
| | 39 | 49.5129 | 4.6100 | 1.84666 | 23.78 | 0.61923 |
| | 40 | 354.3076 | 0.8600 | | | |
| | 41 | −531.1534 | 1.3000 | 1.64000 | 60.08 | 0.53704 |
| | 42 | 82.1113 | 9.7700 | | | |
| RL2 | 43 | −446.1600 | 2.4500 | 1.80100 | 34.97 | 0.58642 |
| | 44 | 49.3710 | 16.9500 | 1.80518 | 25.43 | 0.61027 |
| | 45 | −59.8006 | 1.6500 | | | |
| | 46 | −37.2400 | 1.8000 | 1.77250 | 49.60 | 0.55212 |
| | 47 | 37.2400 | 8.7000 | 1.53172 | 48.84 | 0.56309 |
| | 48 | −74.9356 | 0.1200 | | | |
| | 49 | −195.9450 | 3.1600 | 1.56732 | 42.82 | 0.57309 |
| | 50 | −78.4384 | 8.5100 | | | |
| | 51 | −59.2984 | 4.2800 | 1.54814 | 45.78 | 0.56859 |
| | 52 | −33.8915 | 0.5800 | | | |
| | 53 | −925.1283 | 9.1900 | 2.00069 | 25.46 | 0.61364 |
| | 54 | 53.6208 | 1.2200 | | | |
| | 55 | 40.8129 | 11.2600 | 1.53172 | 48.84 | 0.56309 |
| | 56 | −40.8129 | 0.1200 | | | |
| | 57 | 78.0186 | 7.6800 | 1.59551 | 39.24 | 0.58043 |
| | 58 | −30.2090 | 2.1000 | 2.00069 | 25.46 | 0.61364 |
| | 59 | −150.4003 | 0.2500 | | | |
| | 60 | ∞ | 1.0000 | 1.51633 | 64.14 | 0.53531 |
| | 61 | ∞ | 11.3724 | | | |
| | 62 | ∞ | 33.0000 | 1.60859 | 46.44 | 0.56664 |
| | 63 | ∞ | 13.2000 | 1.51633 | 64.05 | 0.53463 |
| | 64 | ∞ | 5.5099 | | | |

TABLE 10

Master Lens of Example 3

| | WIDE | TELE |
|---|---|---|
| Zr | 1.0 | 120.4 |
| f | 8.30 | 998.46 |
| FNo. | 1.76 | 5.17 |
| 2ω (°) | 70.6 | 0.6 |

TABLE 11

Master Lens of Example 3

| | WIDE | TELE |
|---|---|---|
| DD[12] | 2.8109 | 179.3850 |
| DD[23] | 295.3900 | 2.9674 |
| DD[28] | 2.4964 | 4.2231 |
| DD[35] | 2.3253 | 116.4472 |

TABLE 12

Master Lens of Example 3

| Sn | 13 | 25 | 31 |
|---|---|---|---|
| KA | 1.0000000E+00 | 1.0000000E+00 | 1.0000000E+00 |
| A3 | 3.3484999E−07 | 1.4341034E−09 | −2.4837372E−09 |
| A4 | 3.4708539E−07 | 1.0726671E−07 | −2.3796633E−07 |
| A5 | 1.7815640E−07 | −5.4598300E−09 | −1.1625905E−08 |
| A6 | −4.5054058E−08 | 4.5446725E−10 | 1.0618218E−09 |
| A7 | 6.7040497E−09 | −1.1808220E−11 | −3.9021456E−11 |
| A8 | −5.9737791E−10 | 7.9933403E−14 | 3.6579030E−13 |
| A9 | 3.4501013E−11 | −9.1511307E−15 | 2.2388337E−15 |
| A10 | −1.7034215E−12 | 3.7107919E−16 | 2.8939265E−16 |
| A11 | 9.6957627E−14 | 5.5308506E−18 | −5.6245445E−18 |
| A12 | −4.4624137E−15 | −2.9574739E−19 | −1.6931128E−19 |
| A13 | 8.3632689E−17 | −2.3635232E−21 | 2.2430720E−21 |
| A14 | 2.0291266E−18 | 1.2147121E−22 | 5.3204136E−23 |
| A15 | −1.1813140E−19 | 3.7765063E−25 | −3.5010780E−25 |
| A16 | 1.5090915E−21 | −1.9548099E−26 | −6.9906878E−27 |

Entire Lens System After Replacement With Extender Lens

Figure 9:
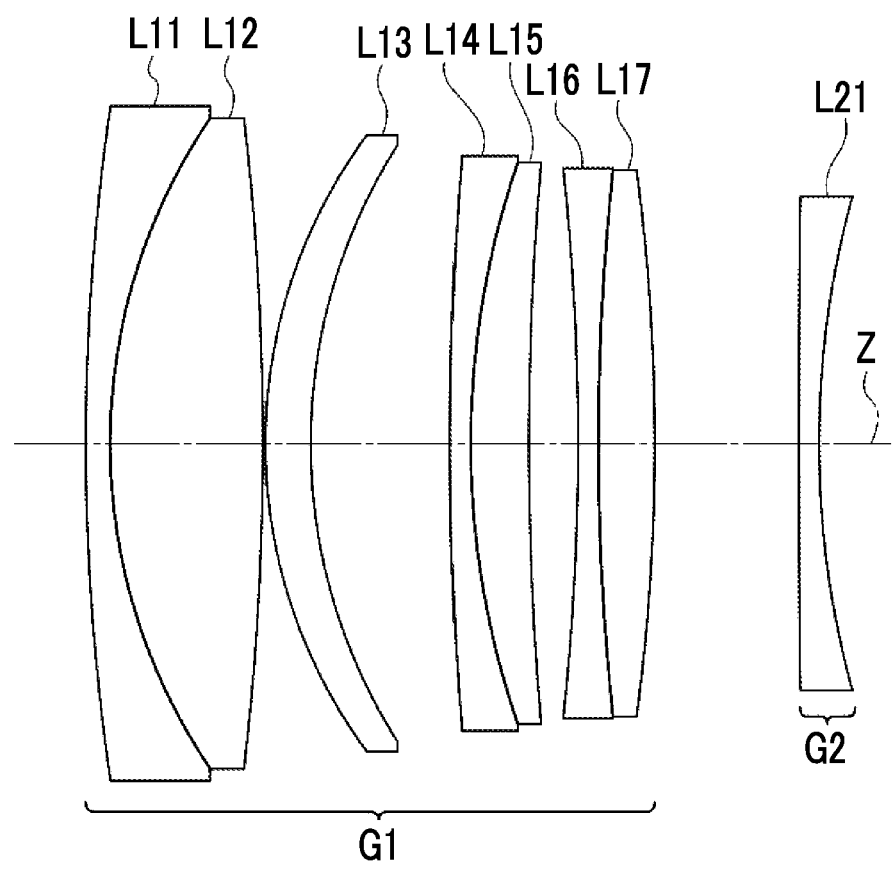
FIG. 9 is a cross-sectional configuration diagram of the extender lens of Example 3.

The extender lens EX of Example 3 is configured to be capable of replacing the RL2 lens group RL2 of the master lens ML. A configuration of the extender lens EX of Example 3 is illustrated in FIG. 9. FIG. 10 illustrates a configuration of the entire lens system after replacement of the RL2 lens group RL2 with the extender lens EX and the luminous flux at the wide angle end and the telephoto end. The extender lens EX of Example 3 consists of, in order from the object side to the image side, the first lens group G1 that has a positive refractive power as a whole, and the second lens group G2 that has a negative refractive power as a whole. The first lens group G1 consists of lenses L11 to L17, and the second lens group G2 consists of the lens L21.

Figure 12:
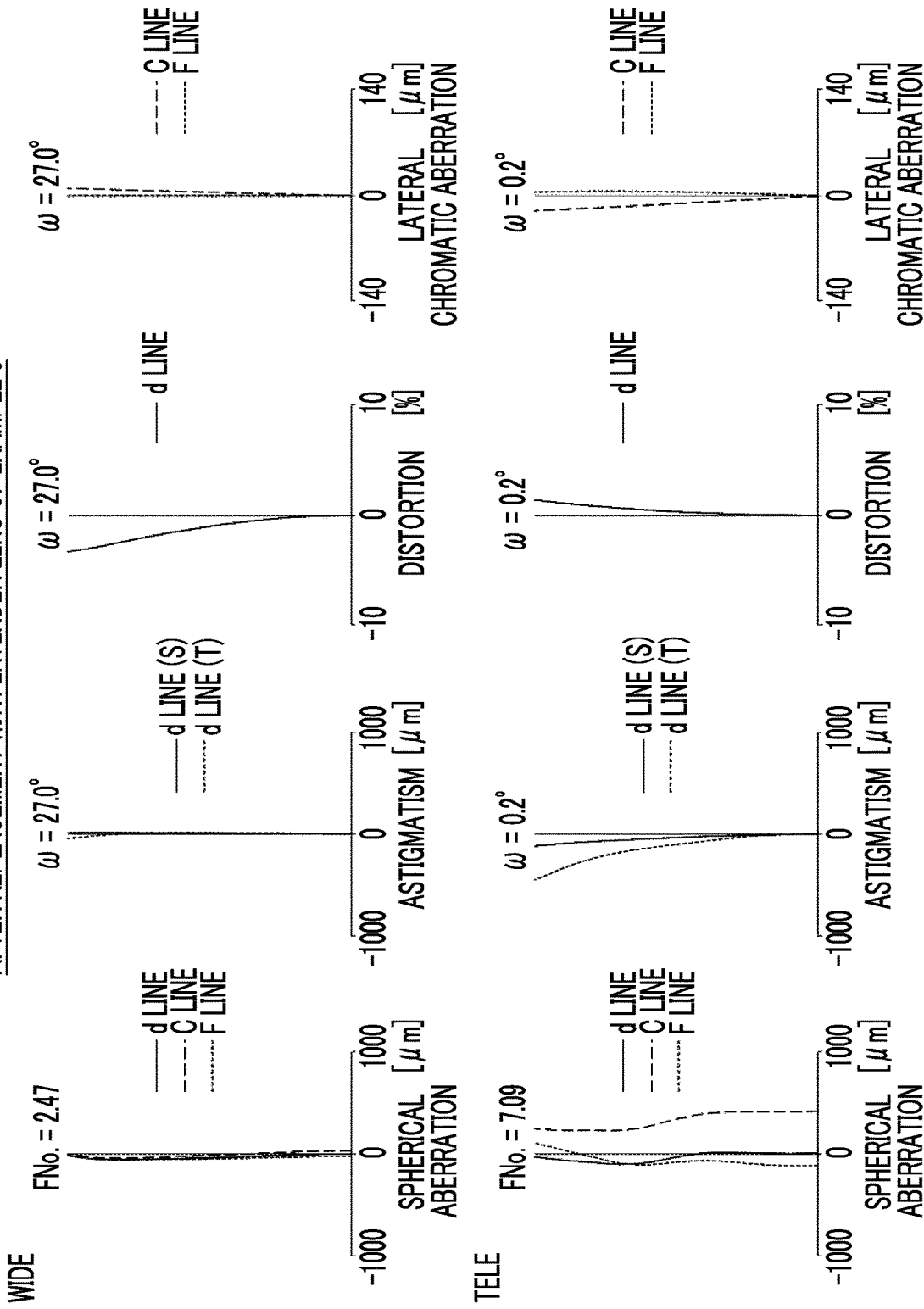
FIG. 12 is each aberration diagram of the entire lens system after replacement with the extender lens of Example 3.

For the entire lens system after replacement with the extender lens EX, basic lens data is shown in Table 13A and Table 13B, specifications are shown in Table 14, and each aberration diagram is illustrated in FIG. 12. Table 13A shows the focusing unit F and the zooming unit V, and Table 13B shows the aperture stop St, the RL1 lens group RL1, the extender lens EX, the RL3 lens group RL3, and the optical member PP. Data in Table 13A is the same as the data in Table 9A. The variable surface interval and the aspherical coefficient of the aspherical surface related to the data in Table 13A are the same as the values shown in Table 11 and Table 12, respectively, and thus, will not be described here.

TABLE 13A

After Replacement With Extender Lens of Example 3

| Sn | R | D | Nd | vd | θgF |
|---|---|---|---|---|---|
| 1 | −1314.4474 | 4.4000 | 1.83481 | 42.73 | 0.56481 |
| 2 | 375.2221 | 2.0000 | | | |
| 3 | 380.9880 | 24.2200 | 1.43387 | 95.18 | 0.53733 |
| 4 | −619.1841 | 0.1200 | | | |
| 5 | 584.0999 | 13.6300 | 1.43387 | 95.18 | 0.53733 |
| 6 | −1937.2286 | 21.5200 | | | |
| 7 | 396.4376 | 17.3400 | 1.43387 | 95.18 | 0.53733 |
| 8 | −2314.5166 | 0.1200 | | | |
| 9 | 295.1601 | 19.2000 | 1.43700 | 95.10 | 0.53364 |
| 10 | ∞ | 2.1600 | | | |
| 11 | 172.6442 | 16.9400 | 1.43700 | 95.10 | 0.53364 |
| 12 | 358.6977 | DD[12] | | | |
| *13 | 935.9870 | 1.8000 | 1.90366 | 31.31 | 0.59481 |
| 14 | 50.7322 | 6.0100 | | | |
| 15 | −135.1019 | 1.8000 | 1.87070 | 40.73 | 0.56825 |
| 16 | 40.8080 | 4.9600 | 1.43700 | 95.10 | 0.53364 |
| 17 | 150.5936 | 4.6900 | | | |
| 18 | −53.0433 | 1.8000 | 1.89800 | 34.00 | 0.58703 |
| 19 | 136.7940 | 4.7200 | 1.89286 | 20.36 | 0.63944 |
| 20 | −96.8742 | 0.1400 | | | |
| 21 | 440.2141 | 9.3900 | 1.80518 | 25.45 | 0.61571 |
| 22 | −34.5600 | 1.8200 | 1.80400 | 46.53 | 0.55775 |
| 23 | −572.9080 | DD[23] | | | |
| 24 | 246.8758 | 11.6400 | 1.49700 | 81.54 | 0.53748 |
| *25 | −123.6093 | 0.1200 | | | |
| 26 | 416.6826 | 10.1100 | 1.43700 | 95.10 | 0.53364 |
| 27 | −127.8440 | 2.5200 | 1.59270 | 35.27 | 0.59363 |
| 28 | −1862.3688 | DD[28] | | | |
| 29 | 120.0199 | 12.8100 | 1.43700 | 95.10 | 0.53364 |
| 30 | −225.9150 | 0.1200 | | | |
| *31 | 239.2747 | 6.1700 | 1.43700 | 95.10 | 0.53364 |
| 32 | −432.6555 | 0.2300 | | | |
| 33 | 884.5549 | 2.4100 | 1.85883 | 30.00 | 0.59793 |
| 34 | 162.5560 | 9.0500 | 1.43700 | 95.10 | 0.53364 |
| 35 | −316.4619 | DD[35] | | | |

TABLE 13B

After Replacement With Extender Lens of Example 3

| | Sn | R | D | Nd | vd | θgF |
|---|---|---|---|---|---|---|
| | 36 (St) | ∞ | 5.7400 | | | |
| | 37 | −109.6023 | 1.3000 | 1.80100 | 34.97 | 0.58642 |
| | 38 | 82.2928 | 0.1200 | | | |
| | 39 | 49.5129 | 4.6100 | 1.84666 | 23.78 | 0.61923 |
| | 40 | 354.3076 | 0.8600 | | | |
| | 41 | −531.1534 | 1.3000 | 1.64000 | 60.08 | 0.53704 |
| | 42 | 82.1113 | 6.4793 | | | |
| EX | 43 | 119.8519 | 1.2000 | 2.00069 | 25.46 | 0.61364 |
| | 44 | 29.8520 | 7.5900 | 1.69895 | 30.13 | 0.60298 |
| | 45 | −144.6229 | 0.1200 | | | |
| | 46 | 26.7401 | 2.2500 | 1.51633 | 64.14 | 0.53531 |
| | 47 | 28.6531 | 6.8998 | | | |
| | 48 | 183.6091 | 1.0000 | 1.84850 | 43.79 | 0.56197 |
| | 49 | 44.5440 | 2.8900 | 1.80518 | 25.43 | 0.61027 |
| | 50 | 165.8123 | 2.4400 | | | |
| | 51 | −130.8990 | 1.0100 | 1.80400 | 46.60 | 0.55755 |
| | 52 | 130.8990 | 2.8000 | 1.80518 | 25.43 | 0.61027 |
| | 53 | −105.9783 | 7.1564 | | | |
| | 54 | 1137.6027 | 1.0000 | 1.61800 | 63.39 | 0.54015 |
| | 55 | 48.0537 | 10.2746 | | | |
| | 56 | −59.2984 | 4.2800 | 1.54814 | 45.78 | 0.56859 |
| | 57 | −33.8915 | 0.5800 | | | |
| | 58 | −925.1283 | 9.1900 | 2.00069 | 25.46 | 0.61364 |
| | 59 | 53.6208 | 1.2200 | | | |
| | 60 | 40.8129 | 11.2600 | 1.53172 | 48.84 | 0.56309 |
| | 61 | −40.8129 | 0.1200 | | | |
| | 62 | 78.0186 | 7.6800 | 1.59551 | 39.24 | 0.58043 |
| | 63 | −30.2090 | 2.1000 | 2.00069 | 25.46 | 0.61364 |
| | 64 | −150.4003 | 0.2500 | | | |
| | 65 | ∞ | 1.0000 | 1.51633 | 64.14 | 0.53531 |
| | 66 | ∞ | 11.3576 | | | |
| | 67 | ∞ | 33.0000 | 1.60859 | 46.44 | 0.56664 |
| | 68 | ∞ | 13.2000 | 1.51633 | 64.05 | 0.53463 |
| | 69 | ∞ | 5.5082 | | | |

TABLE 14

After Replacement With Extender Lens of Example 3

| | WIDE | TELE |
|---|---|---|
| Zr | 1.0 | 120.4 |
| f | 11.37 | 1368.71 |
| FNo. | 2.47 | 7.09 |
| 2ω (°) | 54.0 | 0.4 |

EXAMPLE 4

Master Lens

The master lens ML of Example 4 is in common with the master lens ML of Example 3. Thus, a duplicate description of data will be omitted.

Entire Lens System After Replacement With Extender Lens

Figure 13:
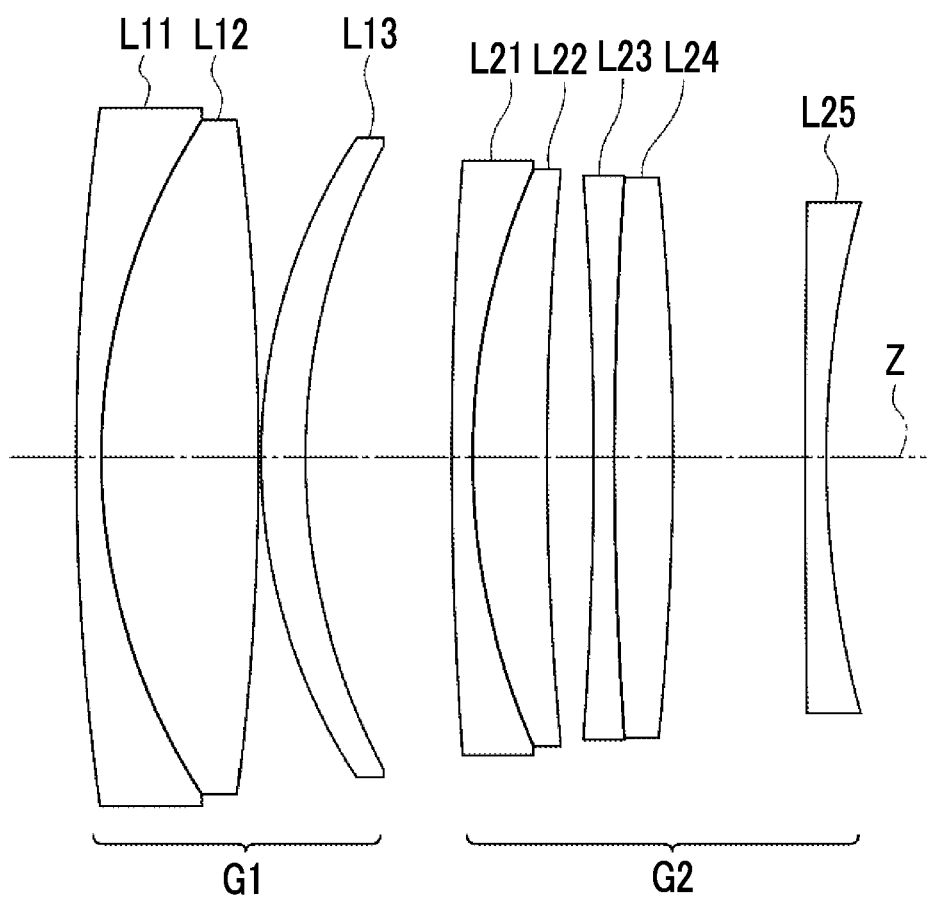
FIG. 13 is a cross-sectional configuration diagram of an extender lens of Example 4.

The extender lens EX of Example 4 is configured to be capable of replacing the RL2 lens group RL2 of the master lens ML. A configuration of the extender lens EX of Example 4 is illustrated in FIG. 13. The extender lens EX of Example 4 consists of, in order from the object side to the image side, the first lens group G1 that has a positive refractive power as a whole, and the second lens group G2 that has a negative refractive power as a whole. The first lens group G1 consists of the lenses L11 to L13, and the second lens group G2 consists of lenses L21 to L25.

Figure 14:
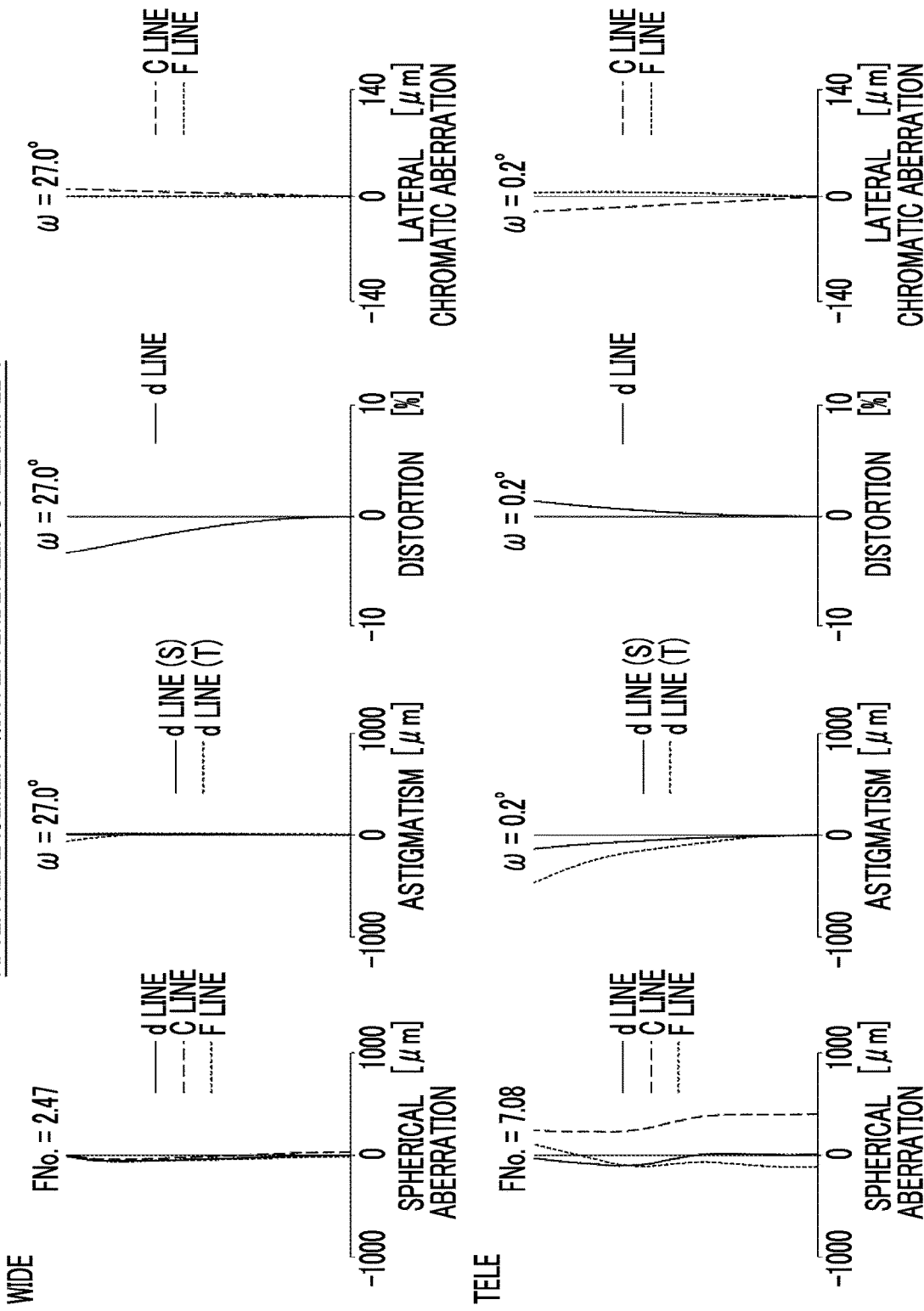
FIG. 14 is each aberration diagram of the entire lens system after replacement with the extender lens of Example 4.

For the entire lens system after replacement with the extender lens EX, basic lens data is shown in Table 15A and Table 15B, specifications are shown in Table 16, and each aberration diagram is illustrated in FIG. 14. Table 15A shows the focusing unit F and the zooming unit V, and Table 15B shows the aperture stop St, the RL1 lens group RL1, the extender lens EX, the RL3 lens group RL3, and the optical member PP. Data in Table 15A is the same as the data in Table 9A. The variable surface interval and the aspherical coefficient of the aspherical surface related to the data in Table 15A are the same as the values shown in Table 11 and Table 12, respectively, and thus, will not be described here.

TABLE 15A

After Replacement With Extender Lens of Example 4

| Sn | R | D | Nd | vd | θgF |
|---|---|---|---|---|---|
| 1 | −1314.4474 | 4.4000 | 1.83481 | 42.73 | 0.56481 |
| 2 | 375.2221 | 2.0000 | | | |
| 3 | 380.9880 | 24.2200 | 1.43387 | 95.18 | 0.53733 |
| 4 | −619.1841 | 0.1200 | | | |
| 5 | 584.0999 | 13.6300 | 1.43387 | 95.18 | 0.53733 |
| 6 | −1937.2286 | 21.5200 | | | |
| 7 | 396.4376 | 17.3400 | 1.43387 | 95.18 | 0.53733 |
| 8 | −2314.5166 | 0.1200 | | | |
| 9 | 295.1601 | 19.2000 | 1.43700 | 95.10 | 0.53364 |
| 10 | ∞ | 2.1600 | | | |
| 11 | 172.6442 | 16.9400 | 1.43700 | 95.10 | 0.53364 |
| 12 | 358.6977 | DD[12] | | | |
| *13 | 935.9870 | 1.8000 | 1.90366 | 31.31 | 0.59481 |
| 14 | 50.7322 | 6.0100 | | | |
| 15 | −135.1019 | 1.8000 | 1.87070 | 40.73 | 0.56825 |
| 16 | 40.8080 | 4.9600 | 1.43700 | 95.10 | 0.53364 |
| 17 | 150.5936 | 4.6900 | | | |
| 18 | −53.0433 | 1.8000 | 1.89800 | 34.00 | 0.58703 |
| 19 | 136.7940 | 4.7200 | 1.89286 | 20.36 | 0.63944 |
| 20 | −96.8742 | 0.1400 | | | |
| 21 | 440.2141 | 9.3900 | 1.80518 | 25.45 | 0.61571 |
| 22 | −34.5600 | 1.8200 | 1.80400 | 46.53 | 0.55775 |
| 23 | −572.9080 | DD[23] | | | |
| 24 | 246.8758 | 11.6400 | 1.49700 | 81.54 | 0.53748 |
| *25 | −123.6093 | 0.1200 | | | |
| 26 | 416.6826 | 10.1100 | 1.43700 | 95.10 | 0.53364 |
| 27 | −127.8440 | 2.5200 | 1.59270 | 35.27 | 0.59363 |
| 28 | −1862.3688 | DD[28] | | | |
| 29 | 120.0199 | 12.8100 | 1.43700 | 95.10 | 0.53364 |
| 30 | −225.9150 | 0.1200 | | | |
| *31 | 239.2747 | 6.1700 | 1.43700 | 95.10 | 0.53364 |
| 32 | −432.6555 | 0.2300 | | | |
| 33 | 884.5549 | 2.4100 | 1.85883 | 30.00 | 0.59793 |
| 34 | 162.5560 | 9.0500 | 1.43700 | 95.10 | 0.53364 |
| 35 | −316.4619 | DD[35] | | | |

TABLE 15B

After Replacement With Extender Lens of Example 4

| | Sn | R | D | Nd | vd | θgF |
|---|---|---|---|---|---|---|
| | 36 (St) | ∞ | 5.7400 | | | |
| | 37 | −109.6023 | 1.3000 | 1.80100 | 34.97 | 0.58642 |
| | 38 | 82.2928 | 0.1200 | | | |
| | 39 | 49.5129 | 4.6100 | 1.84666 | 23.78 | 0.61923 |
| | 40 | 354.3076 | 0.8600 | | | |
| | 41 | −531.1534 | 1.3000 | 1.64000 | 60.08 | 0.53704 |
| | 42 | 82.1113 | 6.9984 | | | |
| EX | 43 | 127.9184 | 1.2000 | 2.00069 | 25.46 | 0.61364 |
| | 44 | 30.5540 | 7.5000 | 1.69895 | 30.13 | 0.60298 |
| | 45 | −135.5582 | 0.1200 | | | |
| | 46 | 28.9976 | 2.1300 | 1.51633 | 64.14 | 0.53531 |
| | 47 | 32.9049 | 7.0154 | | | |
| | 48 | 197.2546 | 1.0000 | 1.84850 | 43.79 | 0.56197 |
| | 49 | 35.4650 | 3.5800 | 1.80518 | 25.43 | 0.61027 |
| | 50 | 149.7975 | 2.2300 | | | |
| | 51 | −195.5000 | 1.0100 | 1.80400 | 46.60 | 0.55755 |
| | 52 | 195.5000 | 2.8000 | 1.80518 | 25.43 | 0.61027 |
| | 53 | −137.1149 | 6.3096 | | | |
| | 54 | 1153.1390 | 1.0000 | 1.61800 | 63.39 | 0.54015 |
| | 55 | 48.0547 | 10.2166 | | | |
| | 56 | −59.2984 | 4.2800 | 1.54814 | 45.78 | 0.56859 |
| | 57 | −33.8915 | 0.5800 | | | |
| | 58 | −925.1283 | 9.1900 | 2.00069 | 25.46 | 0.61364 |
| | 59 | 53.6208 | 1.2200 | | | |
| | 60 | 40.8129 | 11.2600 | 1.53172 | 48.84 | 0.56309 |
| | 61 | −40.8129 | 0.1200 | | | |
| | 62 | 78.0186 | 7.6800 | 1.59551 | 39.24 | 0.58043 |
| | 63 | −30.2090 | 2.1000 | 2.00069 | 25.46 | 0.61364 |
| | 64 | −150.4003 | 0.2500 | | | |
| | 65 | ∞ | 1.0000 | 1.51633 | 64.14 | 0.53531 |
| | 66 | ∞ | 11.3617 | | | |
| | 67 | ∞ | 33.0000 | 1.60859 | 46.44 | 0.56664 |
| | 68 | ∞ | 13.2000 | 1.51633 | 64.05 | 0.53463 |
| | 69 | ∞ | 5.5069 | | | |

TABLE 16

After Replacement With Extender Lens of Example 4

| | WIDE | TELE |
|---|---|---|
| Zr | 1.0 | 120.4 |
| f | 11.36 | 1368.21 |
| FNo. | 2.47 | 7.08 |
| 2ω (°) | 54.0 | 0.4 |

Table 17 shows corresponding values of Conditional Expressions (1) to (8) of the extender lens EX of Examples 1 to 4. The units of the corresponding values of Conditional Expression (7) are $°C.^{-1}$. The lens of the second lens group G2 satisfying Conditional Expressions (4), (5), and (6) is the lens L23 in Example 1, the lens L22 in Example 2, the lens L21 in Example 3, and the lens L25 in Example 4. In the rows below the row related to Conditional Expression (7) in Table 17, a material name and an abbreviated manufacturer name are shown for each of the lens L23 in Example 1, the lens L22 in Example 2, the lens L21 in Example 3, and the lens L25 in Example 4. In Table 17, "HIKARI GLASS" refers to "HIKARI GLASS Co., Ltd.", "OHARA" refers to "OHARA INC.", and "HOYA" refers to "HOYA CORPORATION". The lens of the first lens group G1 of which the surface on the object side has a convex surface and that satisfies Conditional Expression (8) is the lens L13 in all of Example 1 to Example 4.

TABLE 17

| Expression Number | | Example 1 | Example 2 | Example 3 | Example 4 |
|---|---|---|---|---|---|
| (1) | TLex/fl | 0.302 | 0.295 | 0.195 | 0.207 |
| (2) | f2/fex | 0.262 | 0.251 | 0.433 | 0.414 |
| (3) | f1/fex | −0.397 | −0.374 | −0.996 | −0.926 |
| (4) | νn | 69.89 | 81.54 | 63.39 | 63.39 |
| (5) | θgFn + 0.001625 × νn | 0.645 | 0.670 | 0.643 | 0.643 |
| (6) | f2/f2n | 0.196 | 0.317 | 1.000 | 0.956 |
| (7) | dN/dT | $3.6 \times 10^{-6}$ | $-6.2 \times 10^{-6}$ | $-2.2 \times 10^{-6}$ | $-2.2 \times 10^{-6}$ |
| | material name | J-PKH1 | S-FPL51 | PCD4 | PCD4 |
| | manufacturer name | HIKARI GLASS | OHARA | HOYA | HOYA |
| (8) | (Rf − Rr)/(Rf + Rr) | 0.018 | 0.021 | −0.035 | −0.063 |

As is perceived from the data described above, the extender lens EX of Examples 1 to 4 increases the focal length of the entire lens system after replacement approximately 1.4 times the focal length of the master lens ML, more specifically, greater than or equal to 1.37 times and less than or equal to 1.4 times by replacing a part of the master lens ML with the extender lens EX. In addition, both of the master lens ML of Examples 1 to 4 and the entire lens system after replacement have favorable optical characteristics.

Figure 15:
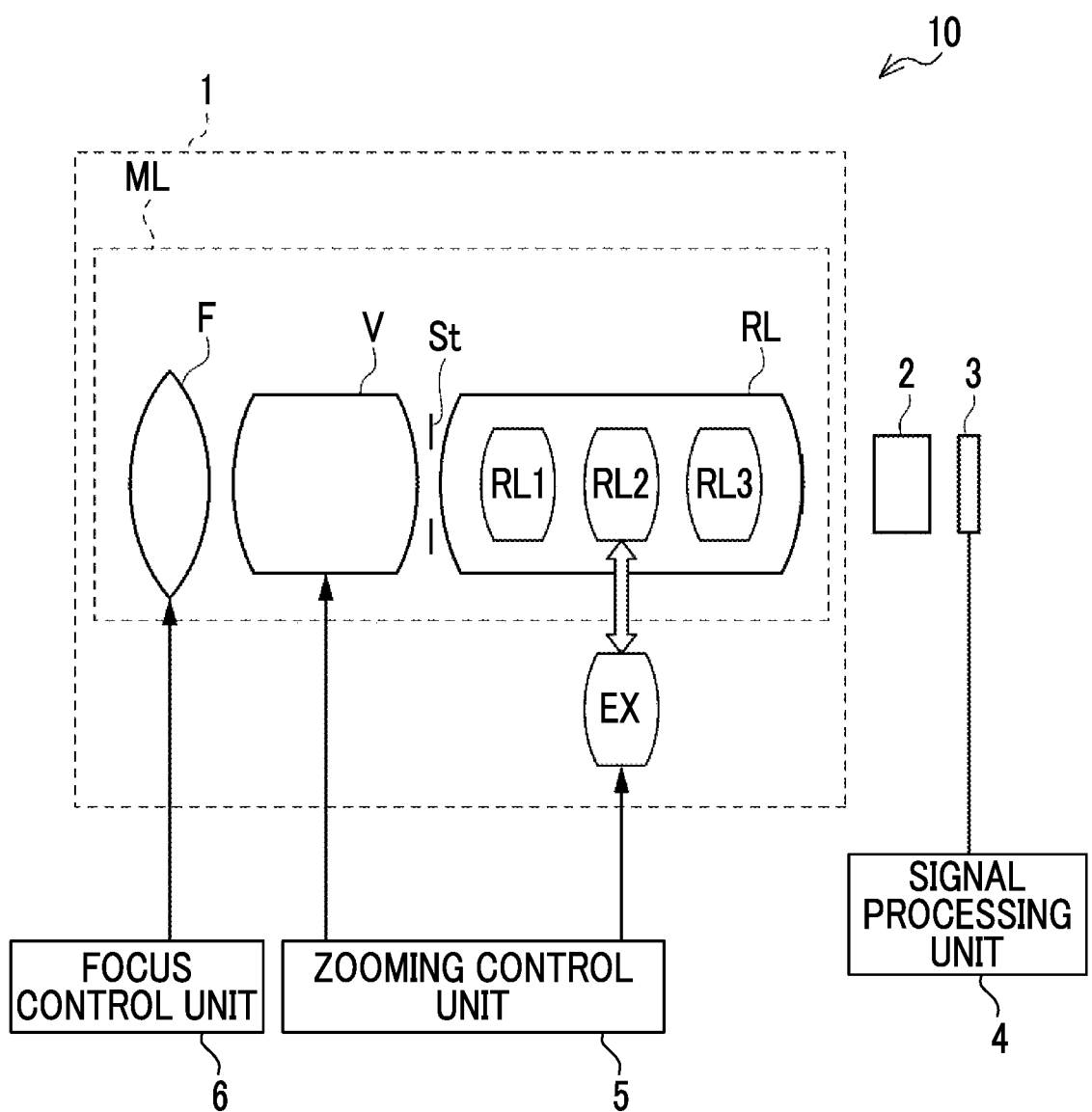
FIG. 15 is a schematic configuration diagram of an imaging apparatus according to one embodiment of the present disclosure.

In the related art, a magnification of an extender lens attached to a zoom lens used in a broadcasting camera or the like has been mainly a power of 2. An F number of the zoom lens on a telephoto side tends to be increased along with achievement of a high magnification. In addition, in the case of using the extender lens having a power of 2, the F number is further increased twice. In order to decrease the F number on the telephoto side, a diameter of a lens of a lens system closest to the object side needs to be increased. However, by doing so, weight is increased, and a load of a user is increased. Thus, an increase in diameter cannot be easily achieved. From these matters, demands for an extender lens of which a magnification is approximately a power of 1.4 have been increased. Examples 1 to 4 are lens systems that meet these demands Next, an imaging apparatus according to the embodiment of the present disclosure will be described. FIG. 15 illustrates a schematic configuration diagram of an imaging apparatus 10 using an optical system 1 according to the embodiment of the present disclosure as one example of the imaging apparatus according to the embodiment of the present disclosure. For example, a broadcasting camera, a movie filming camera, a video camera, a digital camera, and a monitoring camera can be exemplified as the imaging apparatus 10.

The imaging apparatus 10 comprises the optical system 1, an optical member 2 that is arranged on the image side of the optical system 1, and an imaging element 3 that is arranged on the image side of the optical member 2. The optical member 2 is a filter and/or a prism. The optical system 1 comprises the master lens ML and the extender lens EX. In FIG. 15, the focusing unit F, the zooming unit V, the aperture stop St, the image forming unit RL, the RL1 lens group RL1, the RL2 lens group RL2, the RL3 lens group RL3, and the extender lens EX comprised in the optical system 1 are schematically illustrated.

The imaging element 3 converts an optical image formed by the optical system 1 into an electric signal. For example, a charge coupled device (CCD), or a complementary metal oxide semiconductor (CMOS) can be used as the imaging element 3. The imaging element 3 is arranged such that an imaging surface thereof matches an image plane of the optical system 1. While only one imaging element 3 is illustrated in FIG. 15, the imaging apparatus 10 may be an imaging apparatus of a so-called three-plate type including three imaging elements.

The imaging apparatus 10 also comprises a signal processing unit 4 that performs calculation processing on an output signal from the imaging element 3, a zooming control unit 5 that controls zooming of the optical system 1, and a focus control unit 6 that controls focusing of the optical system 1. Replacement between the RL2 lens group RL2 and the extender lens EX is performed by the zooming control unit 5.

While the technology of the present disclosure is described above by exemplification using the embodiment and the examples, the technology of the present disclosure is not limited to the embodiment and the examples and can be subjected to various modifications. For example, the radius of curvature, the surface interval, the refractive index, the Abbe number, and the aspherical coefficient of each lens are not limited to the values illustrated in each numerical value example and may have other values.

What is claimed is:

1. An extender lens that changes a focal length of an entire lens system after replacement to a longer focal length side than a focal length of a master lens by replacing a part of the master lens with the extender lens,
    the extender lens consisting of, in order from an object side to an image side:
        a first lens group; and
        a second lens group having a negative refractive power as a whole,
    the first lens group and the second lens group being formed of a plurality of consecutive lens components,
        the second lens group including at least one lens component of the plurality of consecutive lens components,
    each lens component of the plurality of consecutive lens components being a single lens or a cemented lens,
    the first lens group including at least one lens component of the plurality of consecutive lens components and less than an entirety of the plurality of consecutive lens components,
    the at least one lens component of the first lens group having a positive refractive power as a whole,
    the at least one lens component of the first lens group having a shorter focal length than any other group of consecutive lens components of the plurality of consecutive lens components that begins with a lens component of the plurality of consecutive lens components closest to the object side that excludes the at least one lens component of the second lens group, and a distance from a surface of the extender lens closest to the object side to a surface of the extender lens closest to the image side on an optical axis is denoted by TLex, and a focal length of the first lens group is denoted by f1, Conditional Expression (1) is satisfied, which is represented by $$0.1 < TLex/f1 < 0.36 \quad (1),$$

wherein the first lens group includes a lens of which a surface on the object side has a convex surface, and in a case where a radius of curvature of a surface on the object side is denoted by Rf and a radius of curvature of a surface on an image side is denoted by Rr for at least one lens of the first lens group of which the surface on the object side has the convex surface, Conditional Expression (8) is satisfied, which is represented by $$-0.08 < (Rf-Rr)/(Rf+Rr) < 0.05 \quad (8).$$

2. The extender lens according to claim 1, wherein in a case where a focal length of the second lens group is denoted by f2, and a focal length of the extender lens is denoted by fex, Conditional Expression (2) is satisfied, which is represented by $$0.23 < f2/fex < 0.5 \quad (2).$$

3. The extender lens according to claim 2, wherein Conditional Expression (2-1) is satisfied, which is represented by $$0.24 < f2/fex < 0.46 \quad (2\text{-}1).$$

4. The extender lens according to claim 1, wherein in a case where a focal length of the extender lens is denoted by fex, Conditional Expression (3) is satisfied, which is represented by $$-1 < f1/fex < -0.25 \quad (3).$$

5. The extender lens according to claim 4, wherein Conditional Expression (3-1) is satisfied, which is represented by $$-1 < f1/fex < -0.35 \quad (3\text{-}1).$$

6. The extender lens according to claim 1, wherein in a case where a d line-based Abbe number is denoted by vn and a partial dispersion ratio between g line and F line is denoted by θgFn for at least one negative lens of the second lens group, Conditional Expressions (4) and (5) are satisfied, which are represented by $$60 < vn \quad (4)$$

$$0.64 < \theta gFn + 0.001625 \times vn < 0.7 \quad (5).$$

7. The extender lens according to claim 6, wherein in a case where a focal length of the second lens group is denoted by f2, and a focal length of at least one negative lens of the second lens group satisfying Conditional Expressions (4) and (5) above is denoted by f2n, Conditional Expression (6) is satisfied, which is represented by $$0.1 < f2/f2n < 1.5 \quad (6).$$

8. The extender lens according to claim 7, wherein in a case where a temperature coefficient of a relative refractive index of at least one negative lens of the second lens group satisfying Conditional Expressions (4), (5), and (6) above within a range of 20° C. to 40° C. with respect to d line is denoted by dN/dT and the unit of dN/dT is ° C.$^{-1}$, Conditional Expression (7) is satisfied, which is represented by $$-7 \times 10^{-6} < dN/dT < -2 \times 10^{-6} \quad (7).$$

9. The extender lens according to claim 7, wherein Conditional Expression (6-1) is satisfied, which is represented by $$0.15 < f2/f2n < 1 \quad (6\text{-}1).$$

10. The extender lens according to claim 6, wherein Conditional Expression (4-1) is satisfied, which is represented by $$60 < vn < 86 \quad (4\text{-}1).$$

11. The extender lens according to claim 6, wherein Conditional Expression (5-1) is satisfied, which is represented by $$0.64 < \theta gFn + 0.001625 \times vn < 0.68 \quad (5\text{-}1).$$

12. The extender lens according to claim 1, wherein the first lens group further includes a cemented lens in which a negative lens and a positive lens are cemented.

13. The extender lens according to claim 1, wherein the first lens group includes, consecutively in order from a side closest to the object side to the image side, a cemented lens in which a negative lens of which a surface on the object side has a convex surface and a positive lens are cemented in order from the object side, and the lens of which the surface on the object side has the convex surface and that satisfies Conditional Expression (8).

14. The extender lens according to claim 1, wherein Conditional Expression (1-1) is satisfied, which is represented by $$0.15 < TLex/f1 < 0.33 \quad (1\text{-}1).$$

15. The extender lens according to claim 1, wherein Conditional Expression (8-1) is satisfied, which is represented by $$-0.07 < (Rf-Rr)/(Rf+Rr) < 0.03 \quad (8\text{-}1).$$

16. An optical system comprising:
the master lens that is a zoom lens; and
the extender lens according to claim 1.

17. An imaging apparatus comprising:
the extender lens according to claim 1.

* * * * *